April 26, 1966 W. A. RACZYNSKI ET AL 3,248,236
THERMO-WAX TRANSFER SHEETS
Original Filed June 2, 1960 6 Sheets-Sheet 1
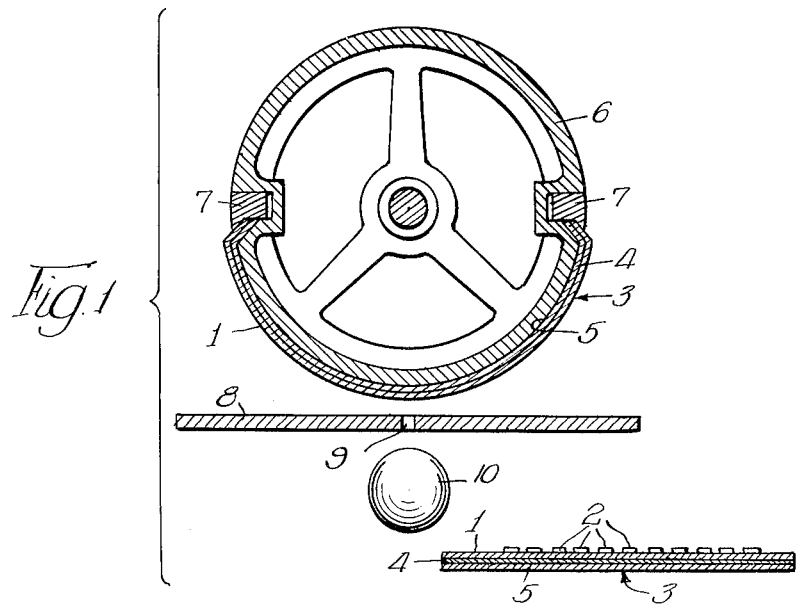
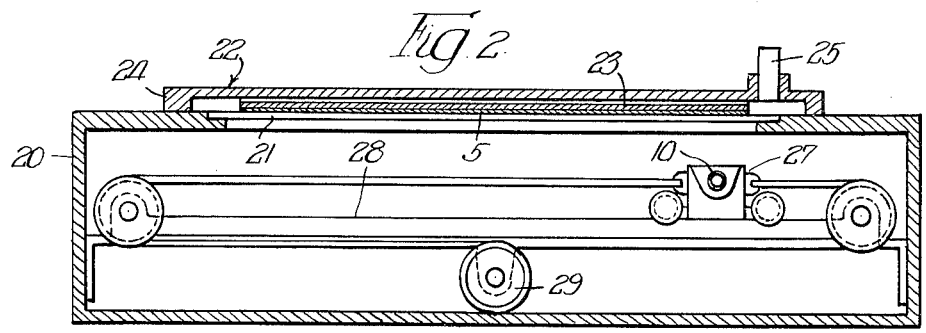
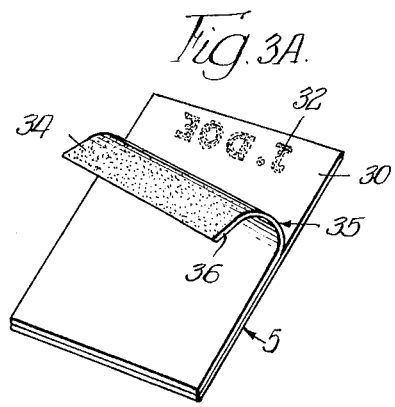
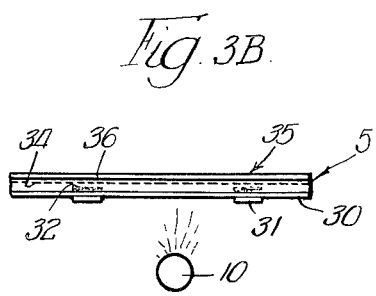
INVENTORS
Walter A. Raczynski,
BY Robert N. Quoss,

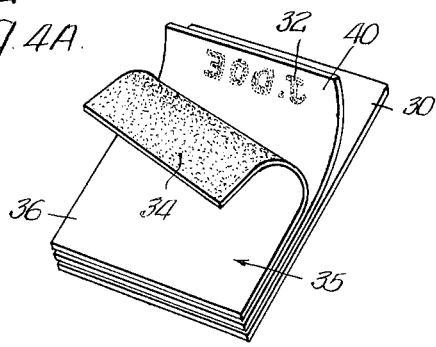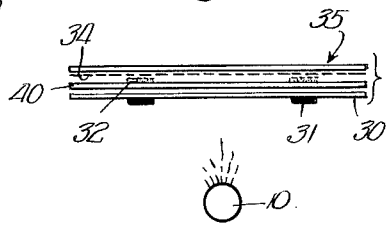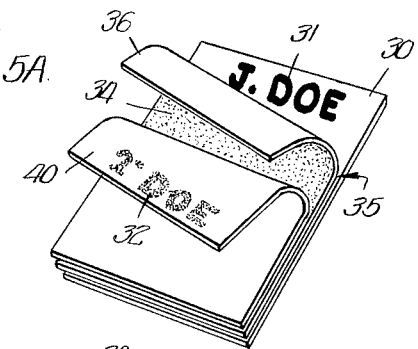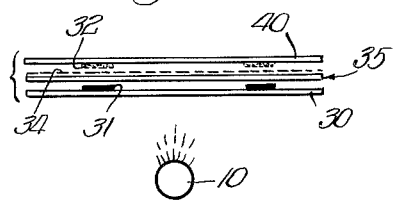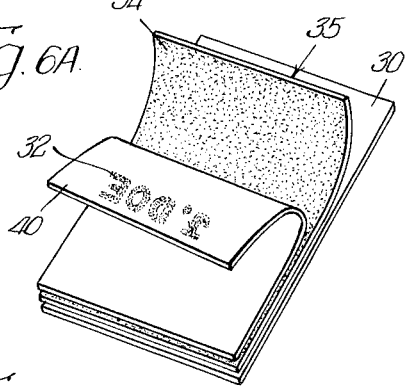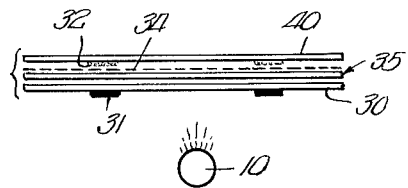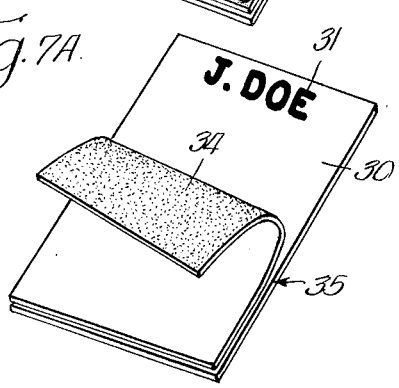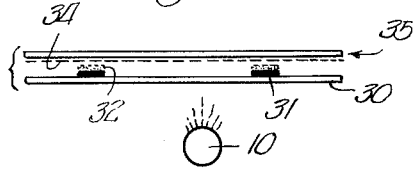

April 26, 1966   W. A. RACZYNSKI ET AL   3,248,236
THERMO-WAX TRANSFER SHEETS
Original Filed June 2, 1960   6 Sheets-Sheet 3
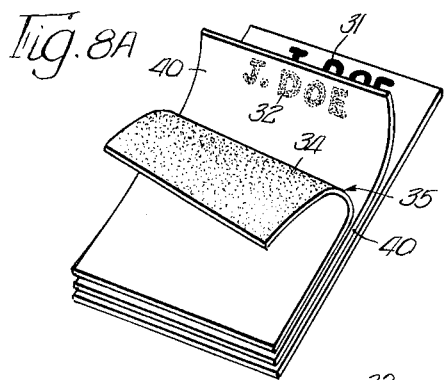
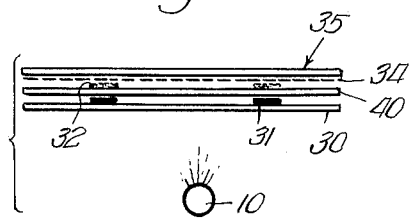
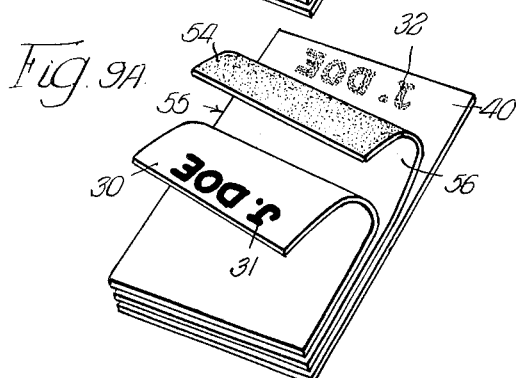
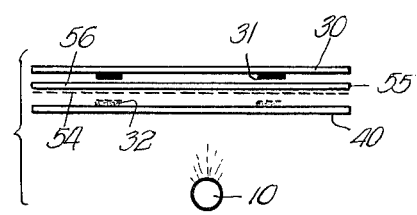
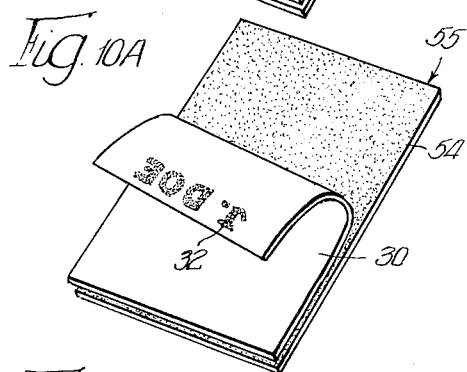
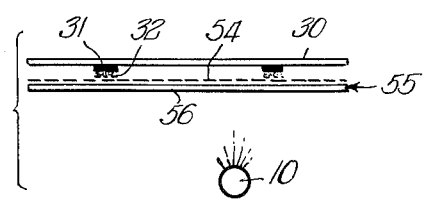
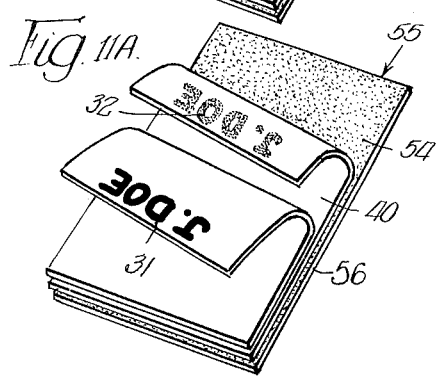
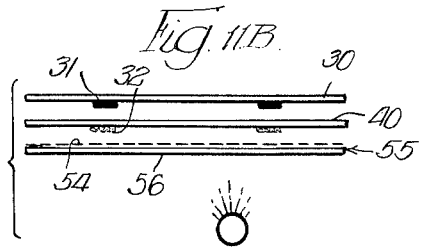
INVENTORS
Walter A. Raczynski,
BY Robert N. Quoss
Byron, Hume, Groen & Clement
Attys April 26, 1966  W. A. RACZYNSKI ETAL  3,248,236
THERMO-WAX TRANSFER SHEETS
Original Filed June 2, 1960  6 Sheets-Sheet 4
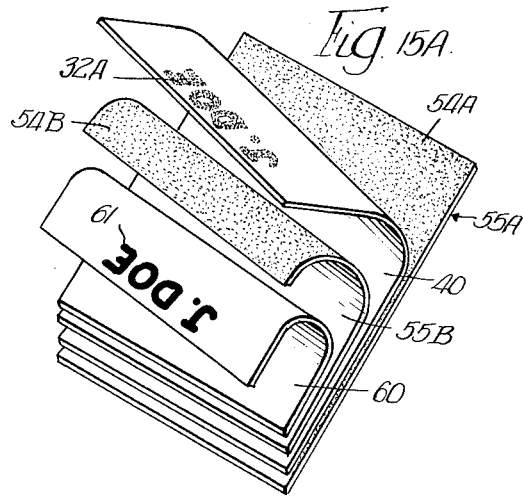
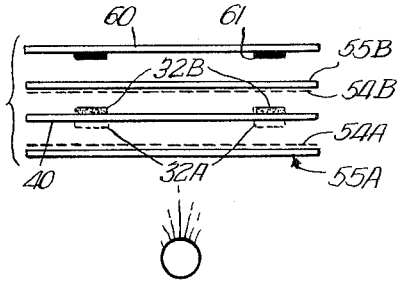
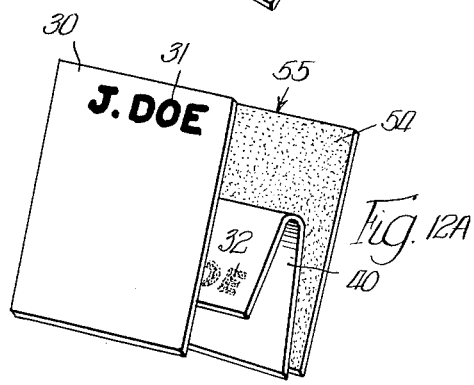
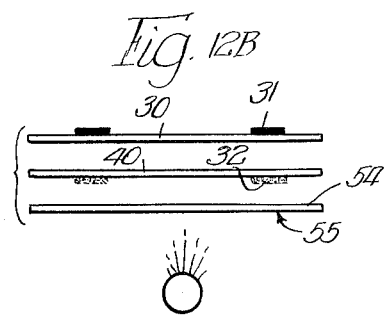
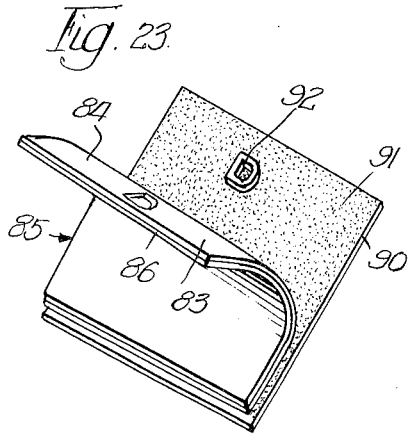
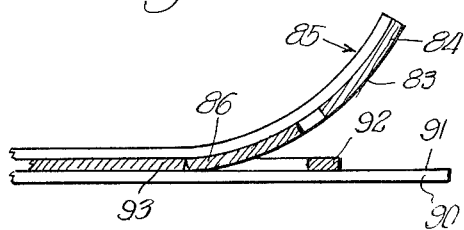
INVENTORS.
Walter A. Raczynski,
BY Robert N. Quoss,
Byron, Hume, Groen + Clement.
Attys.

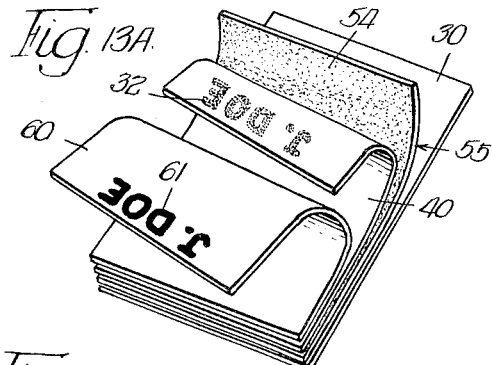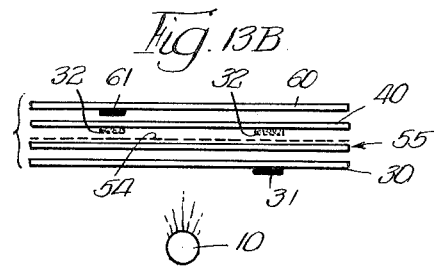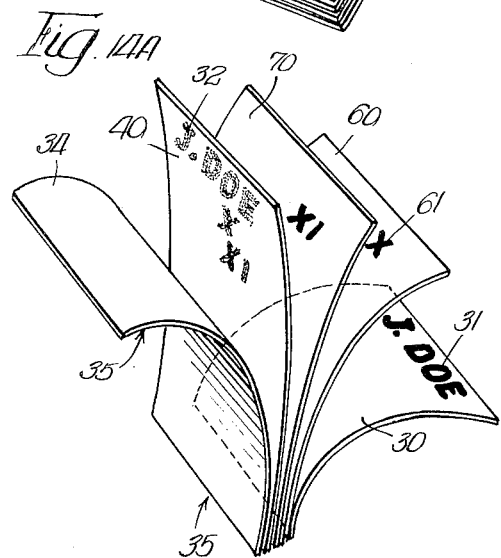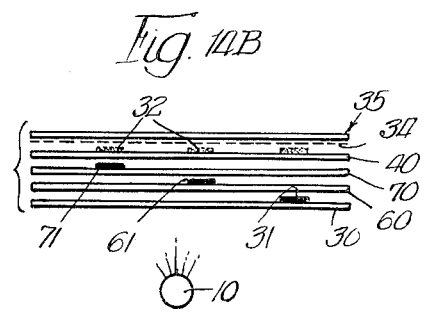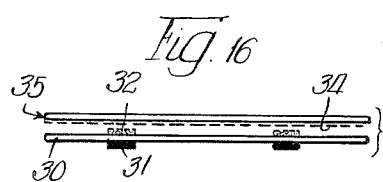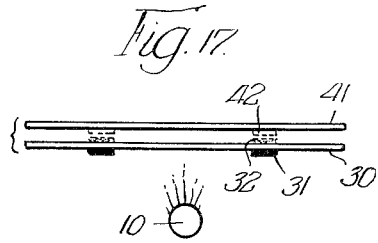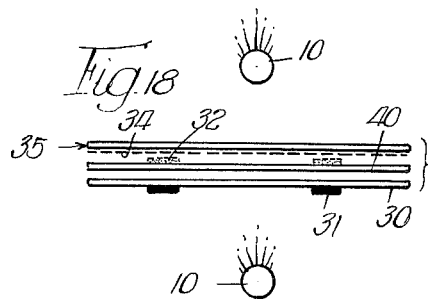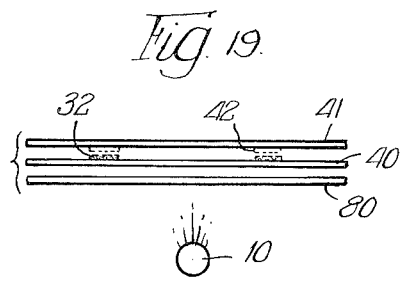

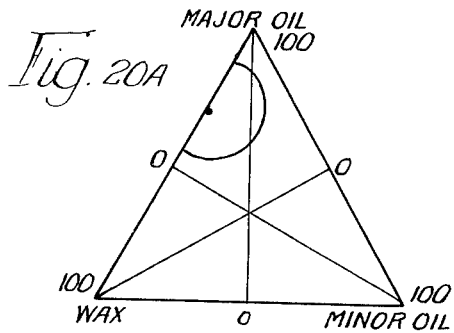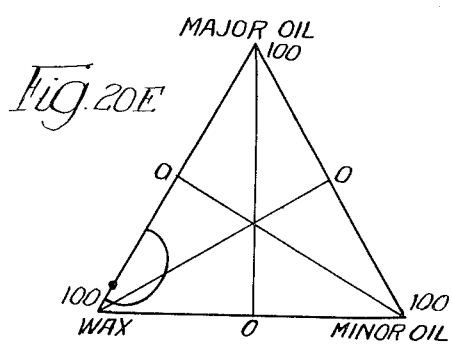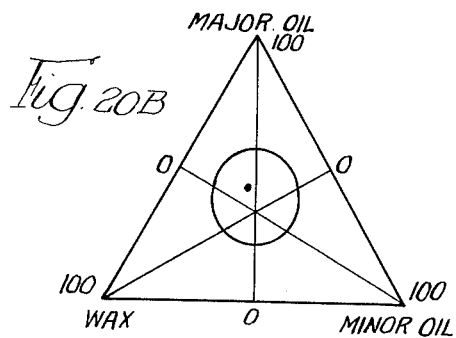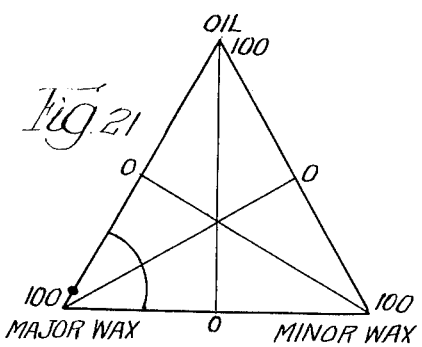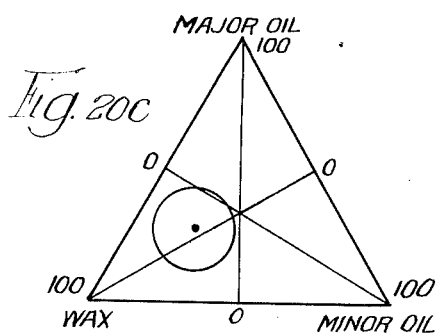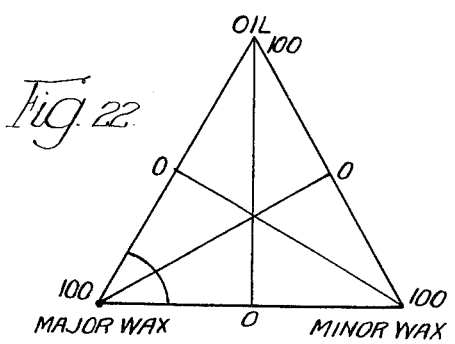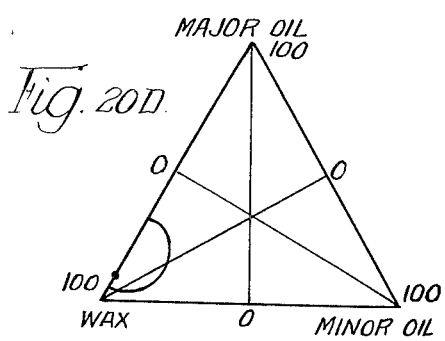

United States Patent Office 3,248,236
Patented Apr. 26, 1966

3,248,236
THERMO-WAX TRANSFER SHEETS
Walter A. Raczynski, Park Ridge, and Robert N. Quoss, Hinsdale, Ill., assignors, by mesne assignments, to Ditto, Incorporated, Chicago, Ill., a corporation of Illinois
Original application June 2, 1960, Ser. No. 33,507, now Patent No. 3,122,998, dated Mar. 3, 1964. Divided and this application Aug. 9, 1962, Ser. No. 221,646
5 Claims. (Cl. 106—14.5)

This is a division of the application Serial No. 33,507, filed on June 2, 1960 and entitled "Infrared Transfer Process," now Patent No. 3,122,998. The invention of that application relates broadly to a new and improved thermo-transfer process for making reproductions from an imaged original. More particularly, that invention relates to means and methods for effecting from an imaged original sheet the corresponding selective heat cementation and mechanical disruption to transfer a heat sensitive material from a supply source onto a copy sheet so as to prepare, in the alternative, a facsimile copy of the original or a master sheet usable in the solvent type or lithographic type multiple duplicating processes.

The present invention is directed to the supply source and the heat sensitive material thereof from which copy is made, and specifically to what is termed herein as the supply or transfer sheet, and comprising essentially a backing or carrying sheet bearing thereon a wax coating or layer of transfer material.

A facsimile copy, as considered herein, is a single copy made directly from and to the size of the imaged original, which copy has as its end purpose the display of the information exactly as imaged on the original.

The solvent type duplicating processes include the spirit process, the hectographic-gelatin process and the chemical reaction processes.

In the spirit duplicating process a master sheet, having characters or designs defined in mirror image or reverse reading form by a waxy material containing an alcohol soluble dye, is placed on the drum of a duplicating machine and contacted with a succession of copy sheets each moistened with a volatile solvent such as alcohol whereby the characters or designs are reproduced in direct reading form on the copy papers.

In the hectograph or gelatin process the characters or designs are defined on a master sheet in direct reading form with a hectograph ink composed of a waxy material containing an alcohol-water soluble dye. This master sheet of paper is then contacted with a gelatin pad or roll to mechanically transfer the hectograph characters or designs in reverse or mirror image to the surface of the gelatin. Copies in direct reading form are made by successively applying copy paper to the pad or roll moistened with a volatile solvent.

In the chemical reaction type duplicating processes, the characters or designs on the master sheet are defined by a waxy material containing a chemical reagent which reacts with a chemical in or on the copy paper when the copy paper is moistened with a liquid containing a solvent for the chemical agents or their reaction products. The chemical reagents may also be in the moistening liquid instead of in the paper.

In the lithographic or planographic process of duplication, the master sheet consists of a hydrophilic base material having imaged thereon, characters or designs composed essentially of a greasy oleaginous material such as a fat or wax. The imaged master sheet is thus differentially receptive to water in the non-imaged hydrophilic area and to a greasy or oily ink in the imaged area containing the oleaginous lithographic material. Thus by moistening the master sheet successively with water and with ink, an inked image is developed thereon which can be transferred alternatively, directly to a copy sheet or to a blanket for retransfer to a copy sheet. In the direct lithographic process, the characters or designs imaged on the master sheet are in mirror or reverse reading form so that when the master sheet is moistened and inked and brought into direct contact with a copy paper, the characters or designs are transferred in direct reading form to the copy paper. In the offset lithographic process, the characters or designs imaged on the master sheet are in direct reading form. In this process, the master is mounted on a duplicating machine in association with a rubber blanket, to which the inked image is first transferred and from which copies are offset upon further contact of the blanket impression with copy paper.

The thermo-transfer process may be used not only for preparing facsimile copy as described hereinafter, but is adaptable to the production of master sheets for the solvent duplicating and lithographic duplicating process. This plural adaptability renders the process particularly attractive for office usage either by itself or as a part of an office reproduction system. However, for the process to be physically adaptable to office usage, the equipment for carrying out the process must be capable of operating successfully under the electrical power limitations of most offices, that is, 110 volt, 20 ampere, 60 cycle alternating current source; the equipment must be of moderate size commensurate with the size of copy sheet to be produced; and the equipment must be of a kind which is simple and easy to use so as to permit the office clerical force to successfully carry out the process.

For a practical commercial process, there are other considerations that must be met. Specifically, the transfer material must be of a kind which is stable at normal handling temperatures and up to approximately 110° F. at normal atmospheric pressures, but it should be also capable of activation or of being rendered "plastic" in the near temperature range above 110° F. at atmospheric pressure.

The term "plastic" as used herein describes a condition of material softening that permits adhesion or interminglement between the material and a contacting surface. Thus for our present purposes, a transfer material is said to be in a plastic condition when it intermingles with and conforms closely, under pressure, to a contacting surface so as to effect a bond or adhesion between the transfer material and the contacting surface.

There are the further considerations that the transfer material used for making the facsimile copy should be relatively "hard" so that the copy prepared therewith will not be subject to smearing and smudging during the course of normal handling and the transfer material for use in preparing the lithographic masters should be relatively "hard" so as to withstand the impression pressures to which the master sheet is subjected during each of its duplication cycles. The transfer material used in preparing solvent duplicating master sheets should be applied to its paper base stock relatively thick in order to provide a master sheet capable of producing a multiplicity of copies and the composition of the material must be such as to effect a sharp pull out of a well delineated plug of transfer material from the supply sheet which forms the image.

These are but some of the considerations that must be met in providing a commercial thermo-transfer process useful for making facsimile copies and for making solvent and lithographic duplicating master sheets.

THE OBJECTS OF THE INVENTION

It is a general object of the present invention to provide a new and improved supply sheet which is adapted for making single copies or masters from a graphic original in a thermo-transfer process.

It is another object of this invention to provide a heat softenable supply sheet which under the influence of a heat pattern is rendered adherent in only the heated areas so that a sharp discrete pull-out of material occurs only in the areas which correspond to the image areas, leaving the unheated adjacent areas undisturbed.

It is a further object of this invention to provide a supply sheet for use with a thermo-wax-transfer process that can create a spirit duplicating master for use with conventional spirit duplicating equipment.

It is a further object of this invention to provide a supply sheet that can create a sharp ink receptive image on a lithographic surface by the thermo-wax-transfer process.

It is another object of the invention to provide a supply sheet which can produce a single copy of an original in a matter of seconds, which copy is both permanent and light proof.

A more specific object of the invention is to provide a supply sheet which can be interposed between a strong radiation source rich in infrared and an image original of which a copy is to be made in a manner so as to transfer sufficient quantities of the incident radiation so that only the areas on the transfer sheet corresponding to the imaged areas on the original become adherent and the other areas corresponding to the non-imaged areas of the original remain unaffected.

Further objects and features of the invention pertain to the particular arrangements and methods whereby the above identified and other objects of the invention are achieved. The invention, both as to its various modes of formation and manners of usage, will be better understood by reference to the following specification and drawings forming a part thereof wherein:

FIGURE 1 is a diagrammatic elevational view of the exposure device illustrative of principles employed in carrying out the purposes of this invention;

FIGURE 2 is a diagrammatic representation of an alternative exposure device for carrying out the purposes of this invention;

FIGURES 3A and 3B through 12A and 12B are diagrammatic representations of fundamental assemblages to be used in the present invention;

FIGURES 13A and 13B, FIGURES 14A and 14B, and FIGURES 15A and 15B are representations of multiple layer variations of the fundamental assemblages;

FIGURES 16, 17, 18 and 19 illustrate sequential arrangements that can be derived from the fundamental assemblages;

FIGURES 20A, 20B, 20C, 20D and 20E are triangular coordinate plots defining formulations usable in transfer materials for the preparation of spirit duplicator supply sheets;

FIGURE 21 is a triangular-coordinate plot defining formulations usable in transfer materials for the preparation of facsimile copy supply sheets;

FIGURE 22 is a triangular-coordinate plot defining formulations usable in transfer materials for the preparation of lithographic duplicating supply sheets; and FIGURES 23 and 24 illustrate an integrate laminate and manner in which physical transfer of transfer material from a supply sheet to a copy sheet is achieved in accordance with the principles of the invention.

BACKGROUND OF THE INVENTION

Giving consideration first to the subject of infrared radiation technology, it is understood that most, if not all, materials in nature are infrared absorptive, but of these materials not all are infrared absorptive to the same degree. Due to the absorption of infrared radiations and the consequent conversion of the radiations into heat energy, the body or material experiences a rise in temperature dependent on the substance, intensity and time of exposure. Where infrared radiation absorbing bodies are carried on a sheet having lesser infrared absorption characteristics or a sheet of substantially non-infrared absorbing material, the controlled exposure of this sheet to infrared radiations will cause the generation of a differential heat pattern in the sheet, with the areas in the sheet corresponding to the infrared radiation absorbing bodies being elevated to the highest heat level or temperature and the other areas being elevated to a lesser heat level or temperature.

For example, this sheet of paper is white and has impressed thereupon dark images in the form of typed characters so that it defines an original sheet having imaged infrared absorptive areas and non-imaged lesser infrared absorptive areas. In the non-imaged areas, a lesser portion of any incident infrared radiations are absorbed, while the greater portion of any incident infrared radiations are either reflected from the surface or transmitted through the sheet. Within the infrared absorbing imaged areas, the converse is true, that is, a greater portion of any incident infrared radiations are absorbed therein and a lesser portion of any incident infrared radiations are either reflected or transmitted on therethrough. Upon irradiation from a controlled infrared source for an exact period and due to the ensuing absorption, the sheet suffers an overall temperature elevation with a lesser and substantially uniform temperature elevation taking place within the non-imaged areas and with a greater and substantially delineated temperature elevation taking place within the imaged areas.

Thus there is developed in the original sheet a dominant heat pattern corresponding identically to the distinctive infrared radiation absorption pattern of the imaged original sheet. The various means and methods by which a differential heat pattern can be generated and utilized are considered further hereinafter and it is necessary only to this point that it be understood that a dominant heat pattern can be generated and also can be utilized for purposes of selectively activating a temperature sensitive transfer material.

In any practical thermo-transfer process, it is necessary that the heat pattern developed in the original sheet be transferred immediately and with an exactitude corresponding to the original to the temperature sensitive transfer material. Specifically, it is necessary that the original be in close heat conductive relationship with the transfer material throughout the interval required to: infrared radiate the original; generate the differential heat pattern therein; and conduct the generated heat pattern undisturbed to the transfer material. But for this process to be effective and efficient, all of these actions must take place substantially simultaneously, under a condition of pressure contact. This raises not only the problems of how much pressure must be applied and how this pressure can be best and most simply applied, but also the problems related to efficient heat conduction, including the thickness of any sheets through which the heat pattern must necessarily be conducted, the planarity of the sheets, and the low heat dispersion and heat absorption controlled by the physical and chemical characteristics of such sheets. These matters are considered in some greater detail hereinafter.

With regard to the thickness of the transfer materials, the material is supplied in a thin layer or sheet form coextensive with the size of the original sheet to be copied and is of a finite thickness and formulation as determined by the ultimate purpose to which the copy sheet is to be employed. This layer is carried by a flexible carrier sheet and the composite is referred to as a supply sheet inasmuch as it serves only the function of supplying the material for activation in the process.

During the period of infrared radiation, this supply sheet may also be subjected to infrared radiation and may generate a heat pattern within the non-imaged areas. The amount of heat generated depends upon the infrared absorption characteristics of the material in the layer and the amount of infrared radiation as a function of time and intensity to which the sheet is subjected. It is appreciated that if the supply sheet is subjected to too great an exposure of infrared radiation, or if it is comprised of such material that is highly absorptive of infrared radiation, the heat developed therein may conflict with, override or obliterate the temperature pattern conducted thereto from the original. Similarly, the original sheet may be too thick or it may be of such heat absorption characteristics as to absorb the heat pattern or too rough so as to be inseparable. The suggestion has been made that this problem can be overcome by effectively blocking all infrared radiation to the supply sheet by utilizing a thick original sheet as a radiation mask. This arrangement presupposes radiation directly on the imaged side of the original sheet.

An alternative suggestion is to use in the transfer layer only those materials that are non-infrared absorptive. These solutions are compromises which limit the commercial acceptability of the copy quality that can be achieved.

First of all, and by way of example, in the making of a master sheet for use in the spirit duplicator process, and this is one of the important objects of the present invention, it has been found, on the basis of experience, that the most successful dyes for use in the spirit process include methyl violet and crystal violet dyes which have the characteristics of being highly infrared absorptive and at the same time being sufficiently soluble and of high tinctorial strength. There are other dyes that are lesser infrared absorptive, but these are generally not preferred because they produce a product of inferior quality. Accordingly, in the transfer process in accordance with the invention and particularly in its use for the preparation of spirit duplicator master sheets, the transfer material is necessarily highly infrared absorptive. Now, according to the suggestion, the difficulty of generating an overall heat pattern in the supply sheet could be avoided by placing the original sheet intermediate the radiation source and supply sheet and using the original sheet of a thickness to block or shield the highly infrared absorptive transfer material on the supply sheet from the unwanted infrared radiations. As suggested, this would contemplate the use of a heavy bond paper as the original sheet. For office usage, this would necessarily exclude from the process the use of lighter weight paper in normal business use. Thus a great percentage of the utility is an office would be lost.

More importantly, with the use of a heavy bond paper there is, as suggested above, the problem of achieving the proper conduction of a heat pattern therethrough without heat diffusion or obliteration therein. In any insulating material such as paper, there is always heat diffusion and the thicker the weight of the paper, the greater the heat diffusion. Accordingly, the copy printed from a spirit duplicator master sheet prepared from a thick original by the thermal process in the normal manner considered by others is fuzzy, filled in, and generally not an acceptable copy, requiring extremely prolonged and undesirable exposure.

Also, the necessary result from using a heavy weight bond paper for the original is the use of a higher intensity infrared radiation source in order to secure a better and more intense heat pattern in the original. This means not only an increase in the power demands for the equipment for effecting the process, but it also means the generation of additional heat within the apparatus itself both directly from the heat generated at the source and from absorption of the infrared rays by the apparatus. The generated heat might be sufficient to activate the whole of the transfer material carried on the supply sheet and obliterate any heat image that might be formed from the original.

Obviously, the forced use of a heavy bond paper for purposes of shielding and protecting the transfer material of the supply sheet is not the desirable solution. The additional heat requirement causes a lowering of the temperature differential between the non-image and image areas and is the cause of broad filled in copy and often causes background to appear in the non-image areas. In the system of this invention, unique results are obtained in employing a transfer material that is highly infrared absorptive and yet operative in the circumstance where radiations are transmitted therethrough either when the supply sheet is intermediate the source and the original, or when the original is intermediate, but is thin enough to transmit radiations. In either instance the transfer material must be able to differentiate between the temperature elevation so generated therein and the heat image conducted thereto from the original sheet. This gives rise to a local cementation of the supply sheet to the copy sheet in the areas which correspond precisely to the image on the original.

As a further discovery, the infrared sensitive transfer material is distinguished as between a supply sheet directly radiated by a source and a supply sheet receiving only a scattering of random radiations. In the former case, the supply sheet is employed in what is identified as the reflex technique where the same supply sheet is first directly irradiated with infrared radiation which are substantially transmitted therethrough to ultimately impinge on the infrared absorbent image on the original where the heat pattern is developed. Secondly, the heat pattern is transmitted back to soften the supply material in the heat pattern areas. In the latter case, the supply sheet is most remote from the infrared radiation and therefore exposed only to a random scattering and this is identified as the shoot-through technique. The internal heat generation problem presented by the shoot-through technique differs so as to be essentially of a different kind. In the shoot-through there must be a continuing control in order to achieve a preferred copy, but in the reflex circumstance, control must be critical, i.e., control of the formulation, the coating thickness, the characteristics of the base paper and the exposure time, if any kind of copy is to be achieved.

By way of review, in order to achieve a desirable thermo-transfer process adapted to easy office use and adapted to produce a variety of kinds of copy, it is necessary that the process be performed at temperatures in the near range above 110° F., that the process be performed under some condition of pressure, that the process be effective for producing quality copy from original sheets of a wide range of weights, and that such quality copies be producible from a transfer material that is highly infrared absorptive. This desirable thermo-transfer process is achieved by employing the mechanisms of the invention in accordance with the method of the invention, as described hereinafter.

THE MECHANISMS OF THE INVENTION

The mechanisms of the invention are the structures employed including the infrared exposure devices, the various assemblages of sheets that may be employed in the process and the physical characteristics and compositions of the various sheets and the transfer materials used in the assemblages. The method of the invention relates to the various operations to which the mechanisms of the invention are subjected in order to achieve the objects of the invention. The method of the invention is considered separately in a subsequent section.

*Exposure devices.*—Giving consideration first to the infrared exposure devices suitable for carrying out the process, reference is made to FIGURE 1. As previously pointed out, it is understood that the process is carried out by using an assemblage of sheets including at least an original sheet and a supply sheet. In FIGURE 1, there is shown a rotatable drum 6 which is adapted to receive an assemblage of sheets 5 carried on the outer surface thereof by means of clamps 7 so that the sheets of the assemblage are in close contact, free of wrinkles, puckers or bulges. Beneath the drum 6 is positioned a platen or shield member 8 having therein an adjustable slit 9. An infrared radiation source 10 is mounted to project infrared radiations through the slit 9 onto the drum 6. Illumination of the source 10 and rotation of the drum 6 past the slit 9 results in a complete exposure of the assemblage of sheets 5 to the infrared radiations. It is noted that in this instance, the pressure exerted on the assemblage of sheets is only that which can be exerted by virtue of the cam surfaces beween the clamps 7 and the drum 6 so that the pressure is slight. This form of support presents obvious problems in attempting to achieve the critical pressure required in the process, but if that problem is overcome, the arrangement does work satisfactorily for carrying out the process.

In FIGURE 2 there is illustrated schematically and in cross-sectional view an alternative exposure device including a frame 20 supporting a platen or glass plate 21 transparent to infrared radiations, upon which the assemblage of sheets 5 is placed. Covering the assemblage of sheets 5 on the platen 21 is a vacuum frame 22 comprising a flexible blanket 23 supported on a cover 24 and supplied with a vacuum connection 25 extending from a vacuum source, not shown, to the spacing between the flexible blanket 23 and the platen 21. The application of a vacuum to the connection 25 creates a partial vacuum within the cavity presented by the assemblage 5 between the platen 21 and the flexible blanket 23 so that the differential pressure between the vacuum on one side of the blanket 23 and atmospheric pressure on the other side of the blanket 23 forces the blanket and assemblage 5 of sheets into close and intimate association with one another against the platen 21. This differential of pressure will vary according to the vacuum applied and can range from a zero to approximately fifteen pounds per square inch, with twelve pounds per square inch being considered preferred.

Mounted below the platen 21 is the infrared radiation source 10 in a carriage 27 supported for movement on a track 28. A reversible drive mechanism 29 is provided for traversing the lamp carriage 27 in both directions on the tracks 28.

Preferably, the infrared radiation source 10 is a commercial device of a kind such as that commonly known as a T-3 Infrared bulb tube manufactured by General Electric Company. The carriage 27 provides an elliptical reflector for the lamp 10 with the filament of the lamp positioned at one focus point of the ellipse and wherein the carriage 27 is positioned so that the other focus is at the contiguous surface between the platen 21 and the assemblage 5. Thus maximum amount of infrared radiation is projected onto the lowermost sheet of the assemblage of sheets 5.

The platen 21 is preferably a plate of glass commercially identified as Grade 3 glass.

By employing the vacuum frame type of exposure device shown in FIGURE 2 with a vacuum source for permitting the exertion of pressure of about twelve pounds per square inch between the flexible blanket 23 and the platen 21, the assemblage of sheets 5 are urged into intimate contact so as to define a non-integrated laminate. Upon operation of the drive mechanism 29, the infrared radiation source 10 is traversed across the surface of platen 21 thereby to infrared radiate the non-integrated laminate assemblage 5 with an amount of exposure to infrared radiation controlled essentially by the traversal rate of the drive mechanism 29. In actual practice, the traversal rate is adjustable between seven inches per second and 1.2 inches per second. The details of the preferred vacuum type exposure device is disclosed in Patent No. 3,007,390 granted November 7, 1961, in the names of Harold Forester and Maynard Gross and entitled "Exposure Device."

Consideration is now directed to the assemblage of sheets 5 that may be employed in the devices of FIGURES 1 and 2 for carrying out the purpose of the invention. As evidenced from a review of the FIGURES 3A and 3B through FIGURES 15A and 15B, there are a plurality of different assemblages.

*The assemblages.*—Before giving detailed consideration to the assemblages, it should be noted that the figures are arranged in pairs, that is, FIGURES 3A and 3B, FIGURES 4A and 4B, and so forth, to FIGURES 13A and 13B. Each pair of figures represents a particular assemblage and in each pair of figures, that figure having the suffix A is a perspective view of the assemblage and that figure having the suffix B is a cross-sectional diagrammatic view of the assemblage. For easier understanding, the perspective drawings are separated views of the assemblages as they would appear in support on the platen of the exposure device shown in FIGURE 2 after complete operation of the process. The cross-sectional drawings are exploded views of the assemblages oriented as they would appear on the platen of the exposure device of FIGURE 2.

As will be seen from the descriptions that follow, it is within the scope of this invention to have the assemblage of sheets comprised of as few as two elements and including as many as five or more elements. Infrared radiation of the original in any assemblage may be effected by a shoot-through technique, by a reflex technique or by a combination of both shoot-through and reflex techniques, wherein two or more originals are employed to give a composite result.

In the reflex technique, the supply sheet of the assemblage is intermediate the infrared radiation source and the original sheet so that the infrared radiations are transmitted through the supply sheet to the original sheet whereon the heat image is generated and then conducted or reflexed back to the supply sheet. As pointed out above, the practice of the reflex technique by radiating the original sheet through the supply sheet is particularly critical because the transmission of radiations through the sheet causes an elevation in temperature which, if not carefully limited, will cause complete activation of the transfer material. Yet if the radiations transmitted are not of a sufficient quantity, the desired heat pattern will never be generated or will be of insufficient strength or intensity at the original sheet to be conducted back to the supply sheet sufficiently to effect bonding. Consideration of both of these techniques and the various assemblages employed therein is given hereinafter.

In the shoot-through technique, the infrared radiations are directed immediately onto the orginial sheet in an assemblage of sheets so as to generate a heat image therein which heat image passes then through the assemblage to the supply sheet.

The shoot-through technique can be either of the kind wherein the infrared radiations strike the infrared absorptive image areas immediately, which is referred to hereinafter as the "shoot-through A technique" or wherein the infrared radiations travel through the thickness of the suitable original sheet before striking the infrared absorptive image areas which is referred to hereinafter as the "shoot-through B technique."

Giving consideration to the arrangement of FIGURES 3A and 3B, there is shown therein an assemblage of sheets 5 including an original sheet 30 having on its face nearest the infrared radiation source 10, characters or designs, represented for purposes of easier understanding by the blocks 31, which are defined by infrared absorptive material such as carbon black inks. On top of this original sheet is placed a supply sheet 35 made up of a carrier 36 and a layer of transfer material 34. In the arrangement shown in the FIGURES 3A and 3B, the layer of transfer material 34 is contiguous to the non-imaged surface of the original sheet 30. Upon practice of the method of the invention as described in a later section, a transfer image 32, identified by the dashed lines on the contiguous face of the original sheet 30 is transferred from the layer of transfer material 34 to the original sheet 30. The dashed lines define the "plug" of transfer material which is released therefrom and which results in transfer to the original sheet whereupon separation mechanical disruption occurs with the "plug" adhering to the original due to the cementation. The transfer image 32 so developed is a reverse reading image of the characters or designs 31 on the original sheet 30. Inasmuch as the transfer image is developed directly on the back side of the original sheet, this is referred to as a first generation image. This example of FIGURES 3A and 3B is referred to as the assemblage for producing a first generation, reverse reading image by means of the shoot-through A technique. As pointed out hereinafter, and conditioned upon use of the proper original sheet and supply sheet, this assemblage is used primarily for preparation of a spirit solvent master sheet although it can also be utilized for preparing a direct lithographic master sheet.

By reference to FIGURES 4A and 4B, there is illustrated another shoot-through assemblage wherein the original sheet 30 is placed nearest the source 10 with its imaged characters or designs 31 facing the source. A copy sheet 40 is placed thereon and on top of the copy sheet 40 is placed the supply sheet 35 with the layer of transfer material 34 contiguous to the uppermost face of the copy sheet 40. Upon practice of the method of the invention, a transfer image 32 is developed on the uppermost surface of the copy sheet 40 contiguous to the layer of transfer material 34 in the supply sheet 35 and which is locally cemented to the copy sheet. Inasmuch as the transfer image is produced on a sheet separate from the original sheet, it is said to be a second generation image. This example of FIGURES 4A and 4B is referred to as an assemblage for producing a second generation, reverse reading image by means of the shoot-through A technique. Inasmuch as the image so produced is reverse reading, this assemblage, with the use of the appropriate original sheet, supply sheet and copy sheet, can be utilized for producing spirit solvent master sheets and direct lithographic master sheets.

In the shoot-through assemblage of FIGURES 5A and 5B, the original sheet 30 is arranged adjacent to the source 10 with the imaged characters 31 faced away from the source 10. Inasmuch as it is obvious that the infrared light rays must project themselves through the layer of the original sheet 30, it is distinguishable from the shoot-through A technique referred to above and is identified as the shoot-through B technique. On top of the original sheet 30 is placed the supply sheet 35 with its layer of transfer material 34 uppermost facing away from the source 10 and on top thereof is placed the copy sheet 40. Upon practice of the method of the invention, a transfer image 32 is formed on the contiguous surface of the copy sheet 40 which image is locally cemented thereto and which image is reverse reading and of the second generation kind. This example of FIGURES 5A and 5B is referred to as an assemblage for producing second generation, reverse reading images by the shoot-through B technique. This assemblage, with the use of proper supply sheets, copy sheets and original sheets, can be utilized for producing spirit solvent master sheets, direct lithographic master sheets, or read through copying facsimiles on transparent copy sheets.

An arrangement for producing direct reading images by the shoot-through A technique is illustrated in FIGURES 6A and 6B. Therein the original sheet 30 is arranged closest to the source 10 with its images 31 thereon facing the same. On top of the original sheet 30 is placed the supply sheet 35 with the layer of transfer material 34 uppermost facing away from the source 10. The copy sheet 40 is placed in contiguous relationship with the layer 34. Upon practice of the method of the invention, a transfer image 32 is formed on the contiguous surface of the copy sheet 40 which image is locally cemented thereon and is direct reading and of the second generation kind. This example of FIGURES 6A and 6B is referred to as an assemblage for producing second generation, direct reading images by use of the shoot-through A technique. This assemblage, with the use of proper supply sheets, copy sheets and original sheets can be used for making facsimile copies, hectograph master sheets and offset lithographic master sheets.

An assemblage for producing direct reading images by means of the shoot-through B technique is illustrated in FIGURES 7A and 7B. Therein the original sheet 30 is arranged adjacent to the source 10 with its imaged surface faced away. The supply sheet 35 is placed thereon with its layer of transfer material 34 facing the source 10 and contiguous to the imaged side of the original sheet 30. Upon practice of the method of the invention, transfer images 32 are formed on the imaged side of the original sheet 30, being locally cemented directly on top of the original images 31. The images so developed are direct reading and inasmuch as they are formed on the original sheet, they are of the first generation kind. This example of FIGURES 7A and 7B is referred to as an assemblage for producing first generation, direct reading images by means of the shoot-through B technique. This assemblage, with the use of appropriate supply sheets and original sheets, is best adapted for making hectograph master sheets although it can be employed for making offset lithographic master sheets.

Another arrangement for making direct reading images by the shoot-through B technique is shown in FIGURES 8A and 8B. Therein the assemblage of FIGURES 7A and 7B is supplemented by the inclusion of a copy sheet 40 intermediate the original sheet 30 and the supply sheet 35. Accordingly, upon practice of the method of the invention, the transfer image 32 is formed on the surface of the copy sheet 40 contiguous to the layer 34 of the supply sheet 35. The transfer image is direct reading and of the second generation kind. This example of FIGURES 8A and 8B is an assemblage for producing a second generation, direct reading image by means of the shoot-through B technique. This assemblage, with the use of appropriate supply sheets, copy sheets, and original sheets 30 can be adapted for producing facsimile copy, hectograph master sheets or offset lithographic master sheets.

In the foregoing FIGURES 3A and 3B to FIGURES 8A and 8B, are illustrated six basic arrangements employing the shoot-through techniques for producing reverse reading and direct reading transfer images. Consideration will now be given to the reflex technique for producing reverse reading and direct reading images.

The transfer of a waxy material to a master in the foregoing assemblies requires the use of controlled sheets. Thus the ability to reproduce from any original which is imaged with infrared absorbing heat generating characters were formerly limited. Through the use of the new and novel reflex technique of this invention this restriction is eliminated because the heat image can be created with a suitably imaged original by transmitting the infrared radiation through the non-integrated laminate through the several sheets which lie intermediate the radiation source and the original. The heat image which results from the absorption of the infrared radiation by the image on the uncontrolled original is transmitted back to the coated surface of the supply sheet as a distinct heat image which is available to plasticize the supply material.

In the reflex assemblies herein considered it should be noted that it is critical that sheets of the non-integrated laminate, that are disposed between the image on the original and the infrared radiation source, must transmit a sufficient quantum of radiation therethrough without absorption, diffusion or reflection. Likewise, the sheets disposed between the image of the original and the supply material on the supply sheet must transmit the distinct heat image without diffusion, absorption or reflection. The physical characteristics of the sheets necessary to give the unique and unsuspected results will be considered later in greater detail.

In FIGURES 9A and 9B are illustrated assemblages for producing reverse reading transfer images by means of the reflex technique. Therein a copy sheet 40 is placed adjacent to the infrared radiation source 10 and a supply sheet 55 made up of a carrier 56 and a layer of transfer material 54 placed on top thereof with the layer 54 facing the infrared radiation source 10. The uncontrolled original sheet 30 is placed on top of the supply sheet 55 with the infrared absorptive image characters 31 facing the source. Upon practice of the method of the invention, the transfer image 32 is locally cemented on the face of the copy sheet contiguous to the layer of transfer material 54. The transfer image is reverse reading and of the second generation kind. This example of FIGURES 9A and 9B is referred to as an assemblage for producing second generation, reverse reading images by means of the reflex technique. This assemblage with the use of appropriate supply sheets and copy sheets can be used for making spirit solvent master sheets, direct lithographic master sheets, or read through facsimiles on transparent copy sheets.

An assemblage for producing direct reading images by the reflex technique is illustrated in FIGURES 10A and 10B. Therein the supply sheet 55 is placed nearest to the source 10 with its layer of transfer material 54 facing away from the source 10. On top thereof there is placed the uncontrolled original sheet 30 with its suitable images 31 facing the source in contiguous relationship with the layer of transfer material 54. Upon practice of the method of the invention, the transfer image 32 is locally cemented directly onto the imaged surface of the original 30 and directly upon the original images 31. Inasmuch as the transfer image is formed directly on top of the original images 31, they are direct reading and of the first generation kind. This example of FIGURES 10A and 10B is referred to as an assemblage for producing a first generation, direct reading image by means of the reflex technique. Through use of appropriate supply sheets 55, this assemblage can be utilized for preparing hectograph gelatin master sheets and offset lithographic master sheets.

A variation of the assemblage for producing a direct reading image by means of the reflex technique is illustrated in FIGURES 11A and 11B. This assemblage utilizes the basic assemblage of FIGURES 10A and 10B with the addition of a controlled and select copy sheet 40 positioned intermediate the original sheet 30 and the supply sheet 55. The transfer image so produced is direct reading and of the second generation kind. This example of FIGURES 11A and 11B is referred to as an assemblage for producing second generation, direct reading images by means of the reflex technique. This assemblage, with appropriate supply sheets 55 and copy sheets 40, can be utilized for preparing fascimile copies, hectograph master sheets and offset lithographic master sheets.

Another form of assemblage for practicing the principles of the invention by means of the reflex technique is illustrated in FIGURES 12A and 12B. This assemblage utilizes the assemblage of 11A and 11B with the variation that the image 31 on the original sheet 30 is faced away from the source 10, rather than towards the source as shown in FIGURE 11B. The transfer image so produced is reverse reading and of the second generation kind. This example of FIGURE 12A and 12B is referred to as an assemblage for producing second generation, reverse reading images by means of the reflex technique. This assemblage can be used for making spirit solvent master sheets, direct lithographic master sheets, or read through facsimiles on transparent copy sheets.

The FIGURES 9A and 9B through 12A and 12B are believed to illustrate the basic assemblages that may be utilized for producing copy by means of the new and novel reflex technique. However, it is to be appreciated that these displays of FIGURES 3A and 3B through 12A and 12B do not exhaust all of the possibilities of assemblages for producing useful copy.

In FIGURES 13A and 13B there is shown an assemblage for producing copy by a conjoint use of the shoot-through and reflex techniques. This capability of a thermal transfer process is extremely important to business systems where data and information falls into two large classifications: variable and constant. One original with the constant or repeated information would be used over and over again with separate originals each bearing variable information and together they will result in composite masters. Therein the first original sheet 30 is placed adjacent to the source 10 with its imaged portion 31 faced thereto. On top of the original sheet 30 and in the order mentioned, are placed a supply sheet 55, a copy sheet 40 and a second original sheet 60. The supply sheet 55 is arranged with its layer of transfer material 54 facing away from the infrared ray source 10 and the second original sheet 60 is arranged with its imaged portions 61 facing towards the infrared ray source 10. Upon practice of the method of the invention, there is cemented locally on the face of the copy sheet 40 contiguous to the layer of transfer material 54 a transfer image 32 which is a direct reading composite image of the information contained in the two separated images 31 and 61 on the original sheets 30 and 60, respectively. The transfer image so formed is direct reading and of the second generation kind. This example of FIGURES 13A and 13B can be referred to as an assemblage for producing second generation, direct reading images by means of the combined shoot-through and reflex techniques and use of two or more imaged originals. It will be noted that the techniques of shoot-through and reflex have been employed in an assembly in excess of 3 elements. It has been found that such use of multiple imaged originals may be used equally effectively to create a composite master or copy which are two and three sheet assemblies.

In FIGURE 10B a third original (not shown) may be placed in association with the backside of the supply sheet 55 so that the net effect is a three sheet assembly distinct from either the assembly of FIGURE 10B or the assembly of FIGURE 6B.

Upon practice of the method of this invention there is caused to locally adhere to the master 30 which also serves as an original an image from the supply sheet. As a result of one exposure the respective originals are transferred to the original farthest from the radiation source, which in itself becomes the master. The radiation must be transmitted through the original adjacent the infrared radiation and also the supply sheet before it reaches the second imaged original.

Each original may have infrared absorptive image on either surface or on one surface. The originals in the three sheet assembly may be placed in association with one another or the supply sheet may be placed intermediate the two originals.

As a further illustration of a multiple assemblage in excess of three elements, reference is made to FIGURES 14A and 14B, which illustrates an arrangement for making direct reading copy from a multiplicity of originals by means of shoot-through technique. Therein a first original sheet 30 is placed adjacent to the source of infrared radiation 10 with its imaged portion 31 facing away therefrom. On top thereof, and in sequential order, is placed a second original 60, a third original 70, a copy sheet 40 and a supply sheet 35. The imaged portion 61 of the original 60 and the imaged portion 71 of the original 70 are both faced away from the source 10 whereas the layer of transfer material 34 on the supply sheet 35 is faced towards the infrared radiation source 10. Upon practice of the method of the invention, there is provided on the face of a copy sheet 40 contiguous to the layer 34a transfer image 32 combining in composite the information contained in the original images 31, 61 and 71. The transfer image so developed is direct reading and of the second generation kind. This example of FIGURES 14A and 14B is referred to as an assemblage for preparing second generation, direct reading images by means of a multiple original, shoot-through technique.

The illustrations of FIGURES 13A and 13B, 14A and 14B show the originals imaged on one surface. The originals may also carry the image on both surfaces, or the image may face toward the infrared radiation source or it may face away from the source.

As described in reference to the use of multiple originals in a three sheet assembly, the multiple originals in four sheet assemblies and larger may be placed in association with one another or the master and supply sheet may be intermediate the originals as shown respectively in FIGURES 14B and 13B.

In the case of FIGURE 14B the assembly may be irradiated by directing the radiation onto the back of the supply sheet 35. It should be noted that the original 30 in this instance may be of any type material whereas the sheets of the originals 60 and 70, and the supply sheet 55 and the master sheet 40 must meet all the critical requirements as described in the new and novel reflex technique discussed earlier.

The use of multiple originals may be extended to the use of multiple supply sheets which again is made possible by the practice of the process of this invention.

An additional illustration of a multiple assemblage in excess of three elements is that of FIGURES 15A and 15B. This assemblage demonstrates the making of a direct reading copy from a multiplicity of supply sheets by means of the reflex technique. Therein a first reflex supply sheet 55A is placed adjacent to the source 10 with its layer of transfer material 54A faced away therefrom. On top of the supply sheet 55A and in the order mentioned, are placed a copy sheet 40, a supply sheet 55B and the original sheet 60. The supply sheet 55B is arranged with its layer of transfer material 54B facing toward the infrared radiation source 10 and the original sheet 60 is arranged with its imaged portions 61 facing towards the infrared source 10. Upon practice of the method of the invention, there is formed on the face of the copy sheet 40 contiguous to the layer of transfer material 54A a transfer image 32A and there is formed on the face of the sheet 40, contiguous to the layer of transfer material 54B, a transfer image 32B. The transfer images 32A and 32B are quite obviously superimposed, the image 32A being direct reading and the image 32B being reverse reading. Such a copy has particular utility as a facsimile reproduction wherein the reverse reading image 32B reinforces the direct reading image 32A. This example of FIGURES 15A and 15B can be referred to as an assemblage for producing multiple direct and reverse reading images by means of reflex technique.

The disclosure of FIGURES 13A, 13B, 14A, 14B illustrates only the principles by which the assemblages of FIGURES 3A and 3B through 12A and 12B can be combined in a variety of layers to produce composite imaged copies or masters.

As a further illustration of assemblages that may be employed, reference is made to FIGURES 16 and 17 and to FIGURES 18 and 19. The figures illustrates, by way of example, sequential assemblages that may be employed as distinguished from simultaneous or unitary assemblages of FIGURES 3A and 3B through FIGURES 15A and 15B.

In FIGURES 16 and 17 there is shown a two step sequential arrangement of assemblages for producing a first generation, direct reading image by shoot-through techniques. This arrangement finds its particular utility in providing a sharp, clean offset lithographic master sheet. Specifically, in FIGURE 16 there is illustrated the preparation of a first generation, reverse reading image by means of the shoot-through technique as illustrated in FIGURES 3A and 3B. As the next step and as shown in FIGURE 17, the copy so prepared is then placed in an assemblage with a copy sheet 41 so that the transfer image 32 is contiguous to one face of the copy sheet 41. For offset lithographic master purposes, the copy sheet 41 can be the master sheet. Upon practice of the method of the invention, the transfer image 32 on the original sheet 30 is retransferred to the copy sheet to form the retransfer image 42. Inasmuch as the original sheet is heated only in the areas of the original image, only that transfer material opposite the original image is retransferred. This example of FIGURES 16 and 17 is referred to as a sequential assemblage for producing first generation, direct reading images by means of double transfer shoot-through techniques. In the event the original 30 in FIGURE 16 does not substantially transmit the heat image created at the characters 31 then the assembly may be irradiated by directing the infrared radiation directly onto the backside of the supply sheet 35 which will now afford a transfer image 32 created by the reflex technique. The method of retransfer of this image will proceed as described above.

In FIGURES 18 and 19 is shown a variation of the arrangement of FIGURES 16 and 17. Specifically, there is shown therein a two step sequential arrangement of an assemblage for producing second generation, direct reading images by the shoot-through technique. In FIGURE 18 a reverse reading image is prepared according to the assemblage illustrated in FIGURES 4A and 4B. As the subsequent step, the copy 40 so prepared is placed intermediate a heat generating sheet 80 and a copying sheet 41 wherein the heat generating sheet is adjacent to the infrared radiation source and the transfer image 32 is borne on the surface of the copy sheet 40 contiguous to the transfer copy sheet 41. Upon practice of the method of the invention, the entire copy sheet 40 is heated thereby effecting a retransfer of the transfer image 32 from the copy sheet 40 to the transfer copy sheet 41 to form the retransfer image 42 thereon. This example of FIGURES 18 and 19 is referred to as a sequential assemblage for producing second generation, direct reading images by means of double transfer shoot-through techniques.

The assemblages of FIGURES 3A and 3B through FIGURES 15A and 15B, FIGURES 16 through 19 and other assemblages can be employed for purposes of making facsimile copy, solvent duplicating master sheets or lithographic duplicating master sheets as need may require. The kind of assemblage is limited by the infrared radiation absorption-transmission and heat conduction characteristics of the sheet and layers employed in the assemblages. It is to the infrared absorption-transmission and heat conduction characteristics of the various sheets employed in the assemblage that attention is now directed.

*The characteristics of the sheets.*—Giving consideration to the problem of developing a sharply delineated heat image at the surface of the layer of transfer material, attention is directed to the various sheets employed in any assemblage where they are disposed between the image on the original and the radiation source and between the image and the supply material on the supply sheet, specifically to their thickness, their smoothness, their infrared absorption characteristics and their heat conduction characteristics. The original sheet, the carrier sheet of the supply sheet and any copy sheet employed within the assemblage should be uniform in its characteristics, it should be substantially non-infrared absorbing so as to avoid unnecessary generation of heat and resulting elevation of temperature, and should be of a kind permitting easy heat conduction through the layer of the sheet without heat diffusion therein. It is appreciated that any substantial diffusion of the heat image in a sheet causes not only an attenuation or diminishment of the temperature differential in the heat pattern, but also permits the pattern to spread and disperse thereby transferring a blurred and obliterated transfer image at the copy sheet characterized by its poor definition.

It has been found that the problem of heat diffusion and the problem of infrared absorption results from the same common source and are avoided if the sheets have a low ash content and are of low content of fillers, barrier coatings or other coatings so that when the sheet is subjected to an infrared light source, it exhibits a characteristic of substantial infrared transparency.

A reliable determination of infrared transparency of material may be had by use of a Densichron instrument manufactured by the W. M. Welch Manufacturing Company of Chicago, Illinois. This instrument is sensitive to infrared light and measures relative transmission on a logarithmic scale. Specifically, a photocell is used in conjunction with an infrared probe providing a source of infrared radiations in a frequency range of 12,000 to 20,000 angstroms. Detection in the instrument is provided by a galvanometer which provides a zero Densichron reading for maximum light exposure to the photocell thereby indicating a condition of complete infrared transparency and can provide other Densichron readings down to 3.5 which would correspond to a material that is substantially opaque to infrared radiations. The Densichron readings are in accordance with the relationship:

$$\text{Optical density} = \log I/I_0$$

where $I_0$ is the standard or maximum current flow for the condition of infrared transparency and $I$ is a current flow for the transparency of the sample being tested.

Using the Densichron, tests have been made on various materials and it was found that the individual sheets through which there must be either infrared transmission or heat conduction in the assemblages illustrated could have a mean Densichron rating of no greater than 0.35. Further, the homogeneity of the sheet or the amount of maximum deviation from the mean value at various points of the sheets must be not greater than 0.15. Both of these Densichron ranges herein stated are maximum for any sheet employed within the assemblages and through which infrared radiations must be transmitted or through which a heat image must be conducted.

Significantly, the heat image transmission qualities of any of the sheets in an assemblage are also influenced by the mil thickness thereof. Accordingly, the greater the number of sheets through which infrared radiations must be transmitted or through which a heat image must be conducted, the greater the need for use of individual sheets of lesser mil thickness.

Specifically, it has been found that the preferred original sheet 30 for use in any of the assemblages of FIGURES 3A and 3B through 8A and 8B should have the following exemplary characteristic:

Caliper, mils _____ 1.1 to 2.6
Infrared Densichron range (mean) _____ 0.0 to 0.1
Infrared homogeneity, plus or minus _____ 0.03

In the reflex technique assemblages of FIGURES 9A and 9B through 13A and 13B, the characteristics of the original paper are not critical. This is because the original in the assemblages of the reflex technique neither transmits infrared radiations nor conducts a heat image. Thus, it is apparent that as far as the reflex techniques are concerned, the original sheets 30 used therein can be of any weight paper, and, as a matter of fact, can carry images on both sides thereof, it being important that the image thereon be sufficiently infrared absorptive and contrasted so as to generate a sharp and intense heat image.

Giving consideration next to the characteristic of preferred copy sheets, it has been found that a sheet such as the sheet 40 in FIGURES 4A and 4B, FIGURES 8A and 8B, insofar as they are infrared transmission mechanisms or heat conductors and whether or not used as spirit master sheets or lithographic master sheets or facsimile copy sheets, should have the following characteristics:

Caliper, mils _____ 1.0 to 2.6
Smoothness (Sheffield units) _____ 21 to 250
Infrared Densichron range (mean value) ___ 0 to 0.16
Infrared homogeneity, plus or minus _____ 0.08

The smoothness measured in Sheffield units is important insofar as the copy sheets 40 are sheets to which the transfer image must attach itself. In that regard, the smoothness characteristic is important to the copy sheets of FIGURES 5A and 5B and 6A and 6B.

The carrier or carrier sheet for the supply sheet which must be subjected to infrared transmission or heat conduction as in the reflex and shoot-through techniques, respectively, specifically as shown in FIGURES 5A and 5B, 6A and 6B, 9A and 9B, 10A and 10B, and 11A and 11B, and 12A and 12B should have the following characteristics:

Caliper, mils _____ 0.9 to 2.8
Smoothness (Sheffield units) _____ 17 to 260
Infrared Densichron range (mean value) ___ 0 to 0.30
Infrared homogeneity, plus or minus _____ 0.06

Carriers for use with supply sheets for producing solvent type masters should also have an oil bleed characteristic of from two to forty minutes.

The infrared transmission characteristic of the carrier sheet employed in the shoot-through processes of FIGURES 3A and 3B, 4A and 4B, 7A and 7B, and 8A and 8B are unimportant inasmuch as these sheets are not called upon to transmit infrared radiations or to conduct a heat image therethrough. However, before giving consideration to transfer materials, it should be understood that the sheets considered herein may be made of any suitable material that conforms to the requirements set forth including paper, cloth, plastic, glass, wood, etc.

*The transfer material.*—The formulation for the transfer material on the carrier of the supply sheet differs according to use for which the supply sheet is to be employed and will thus vary in its formulation and type of wax, dyes, and oils accordingly. The waxes may be naturally occurring waxes selected from the classes of petroleum wax such as paraffin wax, vegetable wax such as carnauba, animal waxes such as spermacetti, insect waxes such as beeswax, and mined waxes such as montan wax; or they may be synthetic waxes such as Carbowax. The dyes for use with the spirit type duplication process are the water-alcohol soluble type from the group of xanthene dyes, such as triphenyl methane and diphenyl methane derivatives typified by crystal violet, methyl violet, rhodamine or nigrosene dyes. Included in the group of dyes suited for transfer sheets used in the preparation of facsimile copy and suited for transfer sheets used in the preparation of lithographic masters are the oil soluble dyes such as the azo dyes, for example Azo Oil Blue B.

The oils used are absorbed by the dyes and serve as a plasticizer for the formulations. The oils that have been found to give the proper absorbency and plasticity characteristics are selected from the group of mineral oils such as saturated mineral oils, for example, Red Z oil, from the group of unsaturated vegetable oils such as castor oils and from the group of animal oils such as lanolin. In the exemplary formulations given hereinafter, it has been found that formulations in which the group of mineral oils are in major proportion and the groups of unsaturated vegetable oils and animal oils are in minor proportion are best suited to the purpose of this invention and for that reason the groups are referred to as "Major Oils" and "Minor Oils," respectively.

The specific formulations and coating condition of a particular mixture depend upon its usage and at present there are considered four basic types of master sheets as follows:

(1) For solvent type duplication by the shoot-through technique;
(2) For solvent type duplication by the reflex technique;
(3) For lithographic master sheet preparation by both shoot-through and reflex techniques; and
(4) For the preparation of facsimile copies by both shoot-through and reflex techniques.

Considering first the master sheets employed for solvent type duplication by shoot-through technique and the master sheets for the solvent type duplication using the reflex technique, in each case the layer of the transfer composition must be of a definite, uniform thickness and present a very smooth surface in order to make complete, intimate contact with the surface to which transfer is to be effected. The formulations of the composition for both the spirit type duplicating master sheets for use with the shoot-through technique and the spirit type duplicating master sheets for use with the reflex technique are essentially the same, the main differences between these two types of master sheets being in the thicknesses of the composition layers employed and the different types of support sheet employed.

The dyes used in the formulations for the transfer compositions of the spirit duplicating type are alcohol soluble and are highly infrared absorbing dyes, having specific oil absorption characteristics which permit these dyes to be dispersed and distributed homogeneously into an oil or wax base vehicle. This oil absorption characteristic is determined on the basis of the quantity of oil that can be uniformly absorbed by a given quantity and kind of dye. For crystal violet dye, a practical maximum oil absorption characteristic (Gardner-Holman method) is a milliliter of oil per five grams of dye. In this circumstance, it means that five grams or less of crystal violet dye can be evenly dispersed and distributed in a milliliter of oil but that if a greater quantity of dye is inserted in a milliliter of oil, the dispersement and distribution of that dye would not be uniform. It has been found, as completely disclosed hereinafter, that in the formulations of transfer material for solvent type duplication usage, the total weight of dye as to other constituents in the formulation may range between 20% and 65%, the upper limit being determined by the amount of oil used in the formulation and the oil absorption characteristic of the particular dye used. The preferred dyes have been found to include crystal violet, as previously mentioned, nigrosine and methyl violet.

It has been found that these dyes with waxes selected from the group of natural waxes including paraffin wax, microcrystalline and ceresin wax, natural mined waxes including montan and ozokerite, and natural vegetable waxes including carnauba, candelilla, Japan wax, flax wax and sugar cane wax and oils including mineral oil, castor oil and lanolin, can be combined under precise conditions and formulations to give a transfer material having the desired properties of plasticity permitting localized adherence or cementation with a contacting surface and permitting mechanical disruption of the layer of transfer material so that there can occur a release and transfer of a discrete plug of the composition from its layer to its contacting master sheet by use in the infrared transfer process. In this formulation, it is not necessary, and actually it is not preferred, that the composition should attain a liquid state in effecting this unique kind of material transfer wherein a plug of the material is transferred from this supply sheet. While it is not completely understood, it can be shown that the specific wax blends play a most significant part in effecting the characteristic of localized cementation which must necessarily occur before there can be any mechanical disruption and which is critical to achieving a discrete and exact transfer of the transfer material from the supply sheet to the master sheet.

In FIGURES 20A, 20B, 20C, 20D and 20E, there is illustrated a range of acceptable formulation mixtures of wax to major oil to minor oil in a tricoordinate graph form for specific percentages of dye in each formulation. Giving specific consideration to FIGURE 20A, this is a tricoordinate plot of the acceptable range of formulations found to be usable for presenting useful transfer compositions in the preparation of solvent type duplicating masters where the dye content is 65% by weight of the total formulation. The single point within the area of 20A defines a specific mixture that has been found to be usable for the preparation of a transfer composition for spirit type duplication. It is understood that in this instance, representative of 65% dye by weight of the total formulation, the plots define the percentage of wax to major oil to minor oil by weight in the remaining 35% of the total formulation. Specifically, as shown in FIGURE 20A, the range of acceptable mixtures of wax to major oil to minor oil in the remaining 35% of the formulation weight is as follows:

| | Percent |
|---|---|
| Wax | 30±20 |
| Major oil | 70±20 |
| Minor oil | 0±15 |

The mixture in an actual formulation is as follows:

| | Percent |
|---|---|
| Wax: | |
|     Carnauba | 30 |
| Major oil: | |
|     Mineral oil (Red Z oil) | 70 |
| Minor oil | 0 | where the mixture of dyes employed is 97% crystal violet and 3% is methyl violet.

In FIGURE 20B is presented a range of acceptable wax to major oil to minor oil mixtures for a formulation including 55% dye. The single point within the area identifies an actual mixture, by way of example for a formulation including 55% dye by weight. In FIGURE 20B, the range of acceptable mixtures for wax to major oil to minor oil for a formulation including 55% dye by weight is as follows:

| | Percent |
|---|---|
| Wax | 33±15 |
| Major oil | 35±15 |
| Minor oil | 32±15 |

The mixture in an actual formulation is as follows:

| | Percent |
|---|---|
| Wax: | |
|     Carnauba | 31 |
|     Beeswax | 13 |
| | 44 |
| Major oil: | |
|     Mineral oil (Red Z oil) | 33 |
| Minor oil: | |
|     Castor oil | 13 |
|     Lanolin | 10 |
| | 23 | where the mixture of dyes employed is 90% crystal violet and 10% methyl violet.

FIGURE 20C illustrates the range of acceptable mixtures of wax to major oil to minor oil for use in the preparation of a spirit carbon formulation for which the dye content is 50% by weight. The area therein defines the range of mixtures found to be usable for purposes of presenting useful transfer compositions for the preparation of solvent type duplicating masters and the single point within the area identifies a specific mixture that has been prepared within this range of mixtures. In FIGURE 20C the range of acceptable mixtures of wax to major oil to minor oil for use in the preparation of a spirit formulation for which the dye content is 50% by weight as follows:

| | |
|---|---|
| Wax | 50±15 |
| Major oil | 30±15 |
| Minor oil | 20±15 |

The mixture in an actual formulation is as follows:

| Wax: | Percent |
|---|---|
| Carnauba | 44 |
| Major oil: | |
| Mineral oil (Red Z oil) | 40 |
| Minor oil: | |
| Castor oil | 12 |
| Lanolin | 4 |
| | 16 | where the mixture of dyes employed is 90% crystal violet and 10% methyl violet.

In FIGURE 20D, there is illustrated a range of acceptable mixtures of wax to major oil to minor oil in a spirit transfer formulation for which the dye content is 40% by weight. The area defined in the figure identifies mixture found to be useful for purposes of presenting useful transfer compositions for the preparation of solvent type duplicating masters and the single point within the area identifies an actual mixture that has been found to be useful for that purpose. In FIGURE 20D, the range of acceptable mixtures of wax to major oil to minor oil found to be useful in a spirit type duplication formulation including 40% dye by weight is as follows:

| | Percent |
|---|---|
| Wax | 80±15 |
| Major oil | 20±15 |
| Minor oil | 0±15 |

The mixture in an actual formulation is as follows:

| Wax: | Percent |
|---|---|
| Carnauba | 90 |
| Major oil: | |
| Mineral oil (Red Z oil) | 10 |
| Minor oil | 0 | where the employed is entirely crystal violet.

In FIGURE 20E, there is illustrated a range of acceptable mixtures of wax to major oil to minor oil for spirit type duplicator formulations for which the dye content is 20% by weight. The area defined therein identifies mixtures found to be useful for purposes of presenting useful transfer materials for the preparation of solvent type duplicating masters. The single point identified within the area indicates an actual mixture found to be useful in this purpose. In FIGURE 20E the range of acceptable mixtures of wax to major oil to minor oil found to be useful in the preparation of formulations for which the dye content is 20% by weight is as follows:

| | Percent |
|---|---|
| Wax | 80±15 |
| Major oil | 20±15 |
| Minor oil | 0±15 |

The mixture in an actual formulation is as follows:

| Wax: | Percent |
|---|---|
| Microcrystalline (Cardis Wax 262) | 88 |
| Candelilla | 2 |
| | 90 |
| Major oil: | |
| Mineral oil (Red Z oil) | 10 |
| Minor oil | 0 | where the dye employed is entirely crystal violet.

FIGURE 20C illustrates a preferred formulation for transfer materials used commercially in preparation for transfer of transfer sheets for spirit type and hectograph type duplicating operations. Each of the tricoordinate plots of FIGURES 20A, 20B, 20C, 20D and 20E defines formulations which, when used in accordance with the infrared transfer process of this invention, achieve the desired characteristics of softening or flow of the transfer material, selective bonding between the transfer material and its adjacent master sheet, and mechanical rupture of the transfer material so that a discrete plug can be pulled from the transfer sheet onto the master sheet in the exact configuration of the image on the original sheet.

The wax mixtures used in the formulations should have melting points which do not exceed 250° F. The use of waxes having higher melting points requires the use of larger quantities of oil in relation to the quantity of wax used and makes it difficult to achieve a transfer material having the desirable characteristics of selective bonding and mechanical rupture by which discrete plugs of material are transferred to a master sheet. It should be pointed out, however, that the success of the process is not determined entirely by the melting point of the wax but is dependent upon the transfer material composition attaining a state of plasticity under the temperature conditions of the infrared transfer process so that selective bonding to the master sheet can be achieved.

The preferred composition, as defined in FIGURE 20C attains a condition of plasticity at a temperature of approximately 143° F., as observed from a plot of time and temperature studies on the composition. Further, it has been determined that for a master sheet and a supply sheet in contact under the pressure of about twelve pounds per square inch, plasticity in the transfer material and bonding between the transfer material and the master sheet occurs at a temperature of approximately 125° F. Twelve pounds per square inch is for all practical purposes the pressure achieved in the vacuum frame structure of FIGURE 2. This temperature for bonding at 125° F. was determined experimentally by using a master sheet and a supply sheet pressed under a weight of twelve pounds per square inch on a graduated temperature bar.

The foregoing discussions with regards to dye, wax, and oil mixtures have related to formulations for use in the preparation of a spirit duplicator type transfer sheet. This information applies both to the transfer sheet used for the preparation of a spirit type duplicator master sheet by the shoot-through technique and for the preparation of a spirit type duplicator master sheet by the reflex technique. The primary difference between the transfer sheets used in the shoot-through process and in the reflex process are the characteristics of the carrier sheet, which characteristics are defined elsewhere herein, and in the thickness of the layer of transfer material carried on the sheets.

In the case of the transfer sheet used for the preparation of a solvent type duplicator master sheet by the shoot-through technique, the layer of transfer material is relatively thick as compared to those layers employed in other types of supply sheets and is in the range of from 0.3 to 1.0 mils in thickness and is applied to the base sheet at a weight of from 4.0 pounds to 8.5 pounds per thousand square feet. In applying this layer of transfer material to its carrier sheet, the composition is flowed on at a temperature slightly in excess of its flow temperature, or in the near range of above 143° F., and then chilled in order to secure some adherence to the carrier without developing excessive bonding therebetween.

With regards to the layer of transfer material employed in the transfer sheet for the preparation of a spirit type duplicator master sheet by the reflex method, the thickness of the layer is considerably less than that used for the shoot-through technique and is in a range from 0.25 to 0.4 mils in thickness and is applied at a weight of from 2.0 pounds to 4.4 pounds per thousand square feet. In applying this layer of material to its carrier sheet, it is flowed on at a temperature slightly above its flow temperature, that is in the near range above 143° F., and the sheet is then chilled in order to secure adherence between the carrier and the layer of transfer material without developing excessive bonding therebetween. A further requirement is that the transfer material be applied to a carrier sheet having an infrared transmission density of 0.1 Densichron units or less, as measured by a Densichron.

Particular care must be exercised in the preparation of the transfer sheet for use in the reflex method because its use requires that the impinging infrared radiations pass substantially through the supply sheet undiminished and impinge on the infrared absorptive, heat-generating characters of the image sheet. This results in a discrete heat image being created which must traverse back through the non-integrated laminate and the supply sheet without dispersion, absorption or reflection to the contiguous surface of the transfer material and master sheet to achieve localized adherence or cementation. This achievement of selective bonding within the imaged areas between the transfer material and the master sheet is dependent upon the formulation of the transfer material, the thickness of the layer of transfer material and the characteristics of the carrier sheet upon which it is laid. It is particularly critical that the layer of transfer material, which is comprised of dyes and wax and oil mixtures that are highly infrared absorptive, be capable of transmitting a substantial amount of the incident infrared radiation without at the same time absorbing so much infrared radiation so as to be softened to plasticity by the heat so generated. A considerable portion of the incident infrared radiation must pass through the transfer sheet to the imaged sheet and the heat image thus created must then be transmitted back through the transfer sheet to secure the localized cementation or bonding at the contiguous surface of the transfer material and master sheet. These conditions are accomplished by use of a formulation such as set forth in FIGURE 20C and the related subject matter of the specification.

Giving consideration to the physical characteristics of the transfer composition to be used on the supply sheets for making facsimile copy, reference is made to the tricoordinate plot of FIGURE 21. As will be noticed from reference to this graph, the variables plotted are oil, major waxes, and minor waxes. A small percentage of dye is also used, but this is of an amount considered not critical and only sufficient to provide necessary coloration and contrast on the facsimile copy. The dyes used are preferably of the oil soluble or wax soluble types such as Azo Oil Blue B dye.

The major constituent in the formula for the transfer material of the supply sheet used in the preparation of facsimile copies consists of refined petroleum wax or waxes. Because such waxes comprise the major constitutent of the formula, they are, for purpose of plotting, referred to as "Major Waxes." It has been found that petroleum paraffin wax is preferred because it has a sharp melting characteristic which best meets the requirement of the infrared transfer process of this invention. A major proportion of the paraffin wax is obtained from a narrow cut distilled fraction having a carbon chain of 29 to 31 carbon atoms and a percentage of straight chain carbons in the range of 84 to 99% and has a melting point of approximately 151° F. This kind of wax has been found to give the most satisfactory results and are represented by the wax sold under the trade name of "Sunoco 5512." The remainder of the wax mixture may be selected from a group of synthetic waxes such as polyethylene glycol 6000, glycerol stearates, penta waxes and glycol fatty acid esters; from the group of fatty acids such as stearic, palmitic and myristic; from the group of insect waxes such as beeswax, and from the group of mined waxes such as montan wax. By virtue of the fact that these last-named waxes appear in the formulation for the transfer material employed in the preparation of facsimile copies in minor proportions, they are for the purpose of plotting in the graph of FIGURE 21 identified as "Minor Waxes." As shown in the tricoordinate plot of FIGURE 21, the range of mixtures usable in the transfer material formulation for the preparation of fascimile copy is within the range as follows:

| | Percent |
|---|---|
| Major wax | 80±20 |
| Minor wax | 10±10 |
| Oil | 10±10 |

The mixture for the preferred transfer composition for preparing facsimile copies is:

| | Percent |
|---|---|
| Major wax: | |
|    Paraffin (Sunoco 5512) | 95 |
| Minor wax: | |
|    Beeswax | 3 |
|    Montan wax | 2 |
| | 5 |
| Oil | 0 |

To this preferred mixture is added Azo Oil Blue Black B dye in an amount so as to constitute approximately 2% by weight of the total formulation.

The preferred transfer material for making facsimile copies has a flow temperature of approximately 141° F. at atmospheric pressure. This temperature is observed from a plot of time and temperature studies made of the material. In the case of a supply sheet and a copy sheet under a contact pressure of approximately twelve pounds per square inch, it is found that plasticity occurs in the transfer material and bonding between the supply sheet and copy sheet occurs at a temperature of approximately 116° F. This temperature was determined experimentally by using a supply sheet and a copy sheet pressed under weight of twelve pounds per square inch on a graduated temperature bar. The preferred transfer material is applied in a thickness from 0.05 to 0.4 mils and in an amount ranging in weight from one pound to three pounds per thousand square feet by heating the transfer material to slightly above its flow point of 141° F. and, thereafter, after application, chilling it in order to secure adherence without bonding to the carrier. The sheet thus coated must be of proper smoothness in order that intimate contact be attained between it and the copy sheet to which the transfer is to be made.

By the use of such a transfer material mixture applied in the manner as described, there is achieved a supply sheet of very thin caliper which is stable at temperatures substantially above room temperature. The copy prepared through the use of the mechanisms herein described, and in the manner described, provides a facsimile copy with a minimal deposit of transfer material, yet sufficient to produce an image of high opacity and contrast by the infrared transfer process of this invention, but unaffected by subsequent handling or moderate heating, so as to be substantially smear-proof. By the use of the transfer material of the thickness defined on a carrier sheet for which the infrared transmission density does not exceed 0.1 Densichron units, there is provided a supply sheet usable in any of the assemblages for preparing facsimile copy by either the shoot-through or reflex techniques. The transfer sheet must be capable of transmitting a substantial amount of the infrared radiation it receives upon exposure without the layer of transfer material being softened to a condition of plasticity due to any heat generation from absorption of some of the incident infrared radiation. Further, the supply sheet so prepared must possess the property of transmitting back to its surface contiguous to the copy sheet the discrete heat pattern so as to soften the contiguous surface in the areas that correspond to the imaged areas of the original. In this circumstance, local cementation or selective bonding between the supply sheet and copy sheet is effected and upon separation of the two sheets a discrete plug of the supply material corresponding to the image on the original is transferred to the copy sheet.

Giving consideration to transfer material suitable for preparing lithographic master sheets, and particularly those of the offset kind, reference is made to the tricoordinate plot of FIGURE 22. The three variables plotted are oil, paraffin wax (Major Wax) and natural waxes (Minor Wax). This composition so prepared bears a close relationship to that employed in the transfer material for making facsimile copy. As a matter of fact, the transfer material used for making lithographic masters must meet all of the requirements outlined in regard to the preferred transfer material for making facsimile copy, but, in addition, must also secure closely to the master and be relatively hard to withstand the continuous pressures to which the lithographic masters are subjected during the operation of the process. Further, the transfer material must be relatively free of oil and the supply sheet must transfer the grease receptive formula only in those discrete areas which correspond to the infrared absorptive, heat-generating images on the original.

It is not entirely necessary to employ a dye in the transfer material, however, for practical reasons, in order to provide a visible image capable of inspection, a dye such as Oil Red O may be employed. The oil used is selected from the group of mineral oils obtained by petroleum distillation and is preferably of the paraffinic or naphthenic base type or mixtures thereof. The wax employed is a mixture of low oil content, refined paraffinic wax in combination with wax selected from the class of mined waxes such as montan and ozokerite. Minor proportions of insect waxes and beeswax may be added to the wax mixture. This formulation provides the desirable property of selective cementation of the transfer material and upon mechanical disruption of the supply sheet from the sheet to which transfer is to be made, causes sharp, well defined, ink receptive plugs to be transferred from the supply sheet to the lithographic master.

The transfer material thus formulated is usable for both the shoot-through and the reflex techniques of imaging a lithographic master. In the shoot-through method, the infrared radiation is first directed onto the infrared-absorptive, heat-generating characters on the original and under contact of pressure a heat image which develops at the original is transmitted to the supply sheet. This heat image must pass undistorted and undiminished through the carrier on which the transfer composition is coated, in order to selectively soften the lithographic transfer composition so that the selective cementation may occur yielding a sharp reading lithographic master on mechanical separation. It is imperative that transfer does not occur in the non-image area because even the most minor transfers of the grease receptive wax coating in the non-image areas will reproduce on the lithographic duplicator.

The lithographic supply sheet may be used in the reflex method. The supply should include the transfer material of a thickness, as defined, on a carrier sheet for which the infrared transmission density does not exceed 0.1 Densichron units. In this method, the infrared radiation is directed onto the uncoated side of the supply sheet and is transmitted through the carrier sheet and the transfer composition to the infrared absorptive, heat-generating image on the original. There the infrared radiations are converted into a heat image which is passed back to the supply sheet. Accordingly, the surface of the transfer material contiguous to the lithographic master is rendered plastic so that local cementation occurs between the surface of the lithographic master in those areas of the supply sheet which corresponds to the infrared-absorptive, heat-generating characters on the original.

Through the use of this unusual novel lithographic supply sheet, the impinging radiations are substantially transmitted therethrough without the development of sufficient heat within the supply sheet which could result in uncontrolled transfer of the grease receptive material to the surface of the lithographic master in the non-image areas. The range of mixtures found to be acceptable in transfer materials for use in preparing lithographic master sheets, as illustrated in FIGURE 22 are as follows:

| | Percent |
|---|---|
| Major wax | 85±15 |
| Minor wax | 10±10 |
| Oil | 5± 5 |

In one embodiment of the transfer material, the following formulation was employed:

| Major wax: | Percent |
|---|---|
| Paraffin wax (Sunoco 5512) | 50 |
| Montan | 50 |

To this mixture is added Oil Red O dye in an amount so as to constitute, by weight, approximately 2% of the total formulation. In these formulations it has been found that minor proportions of natural waxes such as beeswax, Carbowax 6000 and stearic acid provide a constitutent which will carry the dye to be included in the mixture. It has been noted that as the percentage of montan wax, which causes a hard and somewhat brittle structure, is increased beyond the 50%, small percentages of oil must be included in order that the formula have the proper condition of plasticity necessary to achieve the localized cementation under the conditions of exposure of the infrared transfer process of this invention.

It will be noted by comparing FIGURE 21 to FIGURE 22 that the range for acceptable transfer materials for the preparation of facsimile copies includes the range of acceptable materials for use in the preparation of offset lithographic master sheets. However, in the latter case of the lithographic transfer materials, the range of composition is more restricted. The preferred transfer mixtures, in both instances, are in the same proportion, the only difference between the two being that the wax mixture for the preparation of the facsimile copy is made up largely of paraffinic waxes, the relation between the paraffinic and mined waxes being 90:10, whereas in the transfer material for the preparation of offset lithographic masters, the wax mixture is comprised of approximately equal quantities of paraffinic wax and mined wax. The presence of the montan wax in the transfer material for the lithographic master provides a harder surface so that there will be no unwanted transfer occurring as a result of the pressure which is applied to the assembly with the production of undesired background tone which will result if the grease receptive material on the supply sheet is picked up in the non-image areas.

The flow temperature of the mixture for the preferred transfer composition in the preparation of direct and offset lithographic masters lies within the range of 145° at atmospheric pressure to 125° F. at pressures 12.7 pounds per square inch above atmospheric pressure. This material is applied to the carrier in a thickness of from 0.05 to 0.15 mil and in an amount by weight of from one to two pounds per thousand square feet. The resultant supply sheet is relatively thin for usage in the preparation of an offset lithographic master either by the shoot-through or reflex techniques.

In the foregoing there has been described preferred mixtures of waxes, oils and dyes for use in the various supply sheets of the invention. The specific examples have been directed to supply sheets for spirit duplicator type master sheets prepared by either shoot-through techniques or reflex techniques, facsimile copies prepared by either shoot-through or reflex techniques, and offset lithographic duplicator master sheets prepared by either shoot-through or reflex techniques. The same parameters set forth with regard to the spirit duplicator type process will apply to the preparation of transfer materials to be used in the making of hectograph type master sheets and chemical reaction type master sheets. Similarly, the parameters defined for preparing transfer material to be used in making offset lithographic masters will apply to preparation of transfer materials for making direct lithographic master sheets.

The presentation of considerations in preparing the various transfer materials completes the description of the mechanisms employed in the invention. By way of a review these mechanisms have been found to include the exposure devices of FIGURES 1 and 2 involved in carrying out the process, the various assemblages of sheets shown in FIGURES 3A and 3B through 15A and 15B that may be employed in the invention and the characteristics of the various sheets used in the assemblages including the original sheets, copy sheets and carrier sheets and the preferred mixtures for the transfer materials employed in the various assemblages as illustrated in FIGURES 16 through 19. It is left now to consider the method in which these mechanisms are employed in the invention to achieve the purposes thereof. During the course of the consideration of the method of the invention, further understandings will be achieved in regards to the mechanisms themselves.

THE METHOD OF THE INVENTION

Consideration will be given first to the broad nature of the method of usage or philosophy of the invention and subsequently, consideration will be given to the specific method by which the mechanisms of the invention are employed in actual practice to achieve the objects of the invention. The method is considered as two steps: achieving selective bonding in a laminate, and separation of the bonded laminate.

*Achieving selective bonding.*—For the general purpose of explanation and assuming, for example, any one of the assemblages of sheets illustrated in FIGURES 3A and 3B through FIGURES 15A and 15B including an original sheet that is generally infrared radiation transparent but carrying thereon infrared absorbing-heat generating image characters, and a supply sheet which carries on one surface thereof a coating of transfer material flowable at a given temperature at a given pressure, the sheets are arranged so that the transfer material is contiguous to a copying surface on which a transfer image is to be formed. For this general consideration it is unimportant whether the copying surface is one face of the original sheet as in a first generation assemblage or one face of a separate copy sheet as in a second generation assemblage and as referred to herein could be either. In such an assemblage, the sheets are urged into close association so as to form in composite a non-integrated laminate wherein the contiguous surfaces of the sheets are in smooth even contact. This close association is achieved by application of pressure through means of the exposure devices of FIGURE 1 or FIGURE 2. Thereupon infrared rays are impinged in equal amounts upon lateral segments of the non-integrated laminate. For the purposes of this general consideration, it is not important to consider whether the infrared radiation is by the shoot-through technique or the reflex technique but only that the non-integrated laminate is irradiated by infrared radiations.

Within the laminate, the infrared radiations trace their way through the various sheets being selectively absorbed by the infrared absorbing materials and particularly by the image areas of the original sheet. In the image areas of the original, a corresponding heat pattern is developed which defines a heat image. In the practice of the invention by precise control of paper, supply sheets and exposure the heat image corresponding to the image areas of the original sheet is the dominant over any other heat patterns that might be developed within the non-integrated laminate.

The heat image developed in the original sheet must be transmitted substantially undistorted and undiminished through any layers of the non-integrated laminate to heat at least the surface of the layer of transfer material contiguous to the copying surface. This means that the conduction of the heat image must be without any substantial conflicting heat patterns being developed. This is critical for the purposes of maintaining good copy definition, it being understood that with lateral diffusion of the heat there is not only an attenuation or diminution of the peak temperature from that developed by the heat image of the original but that there is also a tendency to spread the heat image thereby to develop a dispersed heat image of substantially greater area than the heat image originally generated in the original sheet and cause fill in of characters.

Upon irradiation, the transfer material will develop a first heat due to infrared absorption of the materials in the non-image areas of the laminate. To this heat is added the image heat due to the conducted heat image generated at the original sheet. Thus at the surface of the transfer material contiguous to the copying surface there is developed a heat pattern including the first heat corresponding to the non-image areas of the original, and a second or cumulative heat made up of the first heat and the image heat and corresponding to the image areas of the original. With proper infrared radiation control the first heat can be limited to generate at the contiguous copying surface a temperature which is below the flow temperature of the transfer coating at the existent pressure condition, whereas the second or cumulative heat at the contiguous copying surface will be sufficient to generate a temperature at or above the flow temperature of the transfer material. This results in a selective activation of the transfer material to a discrete depth at its surface contiguous to the copying surface and of a breadth including only those discrete areas corresponding to the image areas of the original sheet. Preferably the selected activation effected should create the condition of flow only at the surface of the transfer material contiguous to the copying surface as distinguished from its oppositely disposed carrier surface. This condition of flow in the transfer material with the existent pressure thereon is sufficient to achieve the selective integration of or bonding between the copying surface and the contiguous surface of the transfer material.

The above described action is clearly predictable in the case of the practice of the shoot-through methods and applies generally to the circumstance of reflex methods. However, in some of the reflex assemblies the heat image must traverse the thickness of the supply material and in this case it is necessary to exercise critical controls. Specifically it is by critical control of the transfer material formulations, the thickness of the transfer material layer, the characteristics of the carrier sheet as well as the characteristics of the copy sheet that it is possible to achieve the required selective bonding.

As previously pointed out, the coating of transfer material on the backing sheet is applied during the period of manufacture so as to secure the layer of material to the carrier in a manner to permit easy handling but without effecting an integral attachment or bonding which would frustrate removal of the layer therefrom. Thus by exercising the control which effects selective activation of the layer of transfer material to a discrete depth only at its surface contiguous to the copying surface there is avoided the integral attachment or bonding at the transfer material to the carrier sheet.

Further, by utilizing a copying surface that is of relatively greater roughness or tenaciousness as compared to the securing surface of the carrier sheet, in the circumstance where the condition of flow has been developed on the surface of the transfer material contiguous to the copying surface and particularly in the environment of pressure between the copying surface and the transfer material, the transfer material becomes integrated with the somewhat rougher tenacious copying surface thereby to effect the bonding therebetween. Accordingly, upon cooling, the assemblage which has heretofore been the non-integrated laminate becomes a selectively integrated laminate as between the copying surface and the contiguous surface of the transfer material and the selective integration takes place within the areas corresponding to the imaged areas of the original sheet. It cannot be overemphasized that in achieving this precise and exact bonding or integration between the copying surface and the transfer material there is achieved an important and critical aspect of the practice of the invention.

Pausing for a moment and reviewing the functions by which this important and critical aspect in the practice of the invention is achieved, it is first of all necessary that the assemblage including the original sheet and the supply sheet be arranged under pressure to form non-integrated laminate, that one of the outer surfaces of the non-integrated laminate be radiated with infrared rays to develop a heat image corresponding to the image on the original sheet. This generated heat image must be conducted to the surface of the transfer material contiguous to the copying surface without diffusion or attenuation so as to effect on that surface and only to a discrete depth and within the areas corresponding to the heat image a condition of flow whereby due to the condition of pressure and due to the relatively more tenacious nature of the copying surface the otherwise non-integrated laminate is selectively integrated at the copying surface upon cooling and the contiguous transfer material surface within the areas corresponding to the image on the original sheet.

The coincident conditions of: flow only on the one surface of the transfer material, relatively more tenacious character of the copying surface, and pressure between surfaces and the layer of transfer material are considered preferred although not essential as is explained hereinafter. Important to our present considerations is the understanding that at this time the copying surface has become selectively bonded to the contiguous surface of the transfer material in accordance with the image on the original sheet. Accordingly, the imaged original sheet having served its useful purpose, and if it in itself does not constitute the copying surface, can be discarded. But, at this point in the method there is only a selectively integrated laminate and there has been no transfer of an image to the copying surface. The manner of separation of the laminate to achieve a transfer image is the next step in the practice of the invention.

*Separation of the laminate.*—After having completed the step of selective bonding or integration, the final development of the transfer image is achieved by separating the sheet carrying the copy surface from the supply sheet carrying the layer of transfer material. The mechanical separation of the two sheets causes rupture in the transfer layer and release of the transfer material to the copying surface specifically within those areas of integration or bond, corresponding to the imaged areas on the original sheet. The remainder of the layer of transfer material corresponding to the non-imaged areas of the original sheet is reserved to the supply sheet.

Preferably, and as shown in FIGURE 23 and the cross sectional view of FIGURE 24, the supply sheet 85 is separated from the sheet 90 carrying the copying surface 91, and it is through such separation that good definition and complete pull out of plugs 92 from the layer transfer material 84 is achieved. Specifically, as pointed out above there is a securing force or a force of attraction between the surface of the transfer material 84, and its carrier sheet 86, but the greater force of bonding is experienced between the copying surface 91 and the contiguous surface 83 of the transfer material within the selective areas of bonding 93. Lifting of the supply sheet 85 from the sheet 90 carrying the copying surface causes a bending or flexure in the layer of transfer material thereby causing a shear to take place within the layer of transfer material at the areas 93 of bond. Accordingly, a "plug" 92 of transfer material is pulled from the layer, which plug reaches substantially to the depth of the layer of transfer material and to the breadth of the bonding areas corresponding to imaged areas thereby providing on the copying surface a transfer image of sharp definition for which each character is full in both breadth and depth. The quality of the plug is of the kind that the supply sheet provides a sharp negative of the transfer image.

It was pointed out above that the coincident conditions of: flow at the contiguous surface of the transfer material, the relatively tenacious character of the copying surface, and the application of pressure were preferred but not essential coincident conditions to the practice of the invention. In explanation of that statement, while pressure does remain important to any consideration in order to achieve a closeness between the copying surface and the contiguous surface of the transfer material, the process is still effectual even if the condition of flow were developed throughout the thickness of the layer of transfer material, or even if the copying surface were not more tenacious than the carrier surface. However, if the condition of flow should develop throughout the total thickness of transfer material and should the copying surface be of a smoothness, or tenacity, equal or less than that of the surface of the carrier sheet, the attractive forces on the opposite faces of the transfer material could be equalized so as to result in only partial plugs or a poor quality pull out upon mechanical separation of the supply sheet from the copying surface.

By way of review of this section on the method of the invention, in considering the heat and accordingly the temperature developed at the contiguous surface of the transfer material for purposes of effecting its condition of flow, it is appreciated that when a material converts from a solid state to a flow state there occurs an absorption of energy without any substantial change in temperature. Accordingly, to effect this condition of flow it is necessary that the heat source, including the infrared radiation source and the infrared absorbing materials, be capable of developing at least a temperature corresponding to the critical flow temperature of the transfer material and that this temperature be maintained at the appropriate condition of pressure only for an interval sufficient to develop that flow, and to effect bonding with the copying surface. From this it is seen that while the temperature developed within the original is important, most important is the heat or temperature developed within the local areas at the contiguous surface of the transfer material and this is determined at least in part by the heat conductive qualities of the sheets, the thickness of the sheets and amount and kind of filler in the sheets and the number of sheets. Thus the process may be made to work even in the circumstance where the lowest temperature developed in the original sheet is in excess of the critical flow temperature of the transfer material but only if a sufficient differential heat is developed between the image and non-image areas of the original and only if the conduction between the original and the contiguous surface of the transfer sheet is such that at the surface of the transfer material only the second or cumulative heat, corresponding to the image areas, is effective for causing selective activation of the transfer material.

Obviously the first heat at the surface of the transfer material contiguous to the copying surface should never be so great as to cause undesired activation of the transfer material. But also the second or cumulative heat should never be permitted to advance to any extreme level above that required to effect the condition of flow because such heating would create an extreme lateral temperature differential in the transfer material causing increased heat diffusion and a dispersed and filled in image of substantially greater area than the area of the image on the original. This would result in poor character definition and loss of legibility.

The general method or philosophy of the invention just described will be better understood and appreciated upon consideration of the actual mechanisms and methods practical in accordance with the invention.

*Examples in the practice of the invention.*—In the following examples of the invention as actually practiced, an exposure device of the vacuum frame type such as shown in FIGURE 2 is employed. In all of these examples the only variant within the exposure device is the traversal rate of the infrared radiation source. Accordingly, a recitation herein of the critical conditions within the exposure device will be understood to apply to all of the examples recited hereinafter.

Source: Commercial infrared bulb (General Electric T–3).
Reflector (elliptical focus distances): 2 inches.
Glass plate: Grade 3 plate glass.
Pressure: 12 lbs.

A blower is imployed within the apparatus for maintaining the machine substantially at ambient temperature.

*Example I, spirit master sheet by shoot-through.*—The assemblage used in the preparation of a spirit master sheet by shoot through is that illustrated in FIGURES 4A and 4B and is properly referred to as the assemblage for producing second generation reverse reading images by the shoot-through technique. In this assemblage there is included an original sheet 30 bearing the transfer image 32, and a supply sheet 35 made up of a layer of transfer material 34 and a backing sheet 36. The critical mechanisms are the original sheet 30, the master sheet 40 and the composition of the layer of transfer material 34.

Exposure of the mechanisms in accordance with the teachings of this invention results in selective activation of the transfer material to a discrete depth at the surface contiguous to the master sheet and of a breadth corresponding only to the image areas of the original. The desired cementation or bonding takes place between the supply sheet and master sheet so that thereafter mechanical separation of the sheets causes ruptures in the layer of transfer material at the areas of cementation. In this manner plugs of transfer material, to the depth of its layer, are pulled from the supply sheet thereby presenting on the master sheet a discrete and accurate master for preparation of copies by the spirit type duplicator process.

In actual practice the original sheet has the following characteristics:

Caliper, mils _____ 1.4
Densichron rating _____ 0.16
Homogeneity _____ 0.04

The copy sheet or master sheet has the following characteristics:

Caliper, mils _____ 1.4
Densichron rating _____ 0.16
Homogeneity _____ 0.04
Smoothness, Sheffield _____ 80

The composition of the transfer material is exactly that as set forth in FIGURE 20C:

|  | Percent |
| --- | --- |
| Wax mixture | 44 |
| Major oil | 40 |
| Minor oil | 16 | with crystal violet and methyl violet dyes being added to the amount of 50% of the total weight of the wax, oil and dye formulation. The thickness of the transfer layer is 0.6 mils.

For a sharply delineated master sheet carrying thereon a transfer image of full breadth and depth the exposure rate was found to the three inches per second.

*Example II, spirit master sheet by reflex.*—The assemblage used in preparing a spirit master by reflex is illustrated in FIGURE 9A and 9B. The assemblage thereof is properly referred to as a second generation reverse reading image by the reflex technique. Therein the critical components are the copy sheet or master sheet 40, the supply sheet 55 including the composition of the transfer material and the characteristics of the carrier sheet 56. The characteristics of the original sheet 30 are not important other than it be capable of developing a dominate heat image corresponding to the original image thereon, and that the sheet itself be substantially non-absorptive of infrared radiation.

The characteristics of the copy sheet or master sheet are a follows:

Caliper, mils _____ 1.4
Densichron rating _____ 0.16
Homogeneity _____ 0.02
Smoothness, Sheffield _____ 80

The characteristics of the transfer material are:

|  | Percent |
| --- | --- |
| Wax | 44 |
| Major oil | 40 |
| Minor oil | 16 | with crystal violet and methyl violet dye in the amount of 50 by weight of the total weight of the wax, oil and dye formulation. The thickness of this transfer material layer is 0.3 mils.

The characteristics of the carrier sheet are as follows:

Caliper, mils _____ 1.2
Densichron rating _____ 0.04
Homogeneity _____ 0.04
Smoothness, Sheffield _____ 90

By operating the exposure device to provide a traversal at the rate of 3.4 inches per second, there is produced a sharply delineated master sheet carrying thereon a transfer image of full breadth and depth.

Performance of the method of the invention in accordance with the novel reflex teachings causes selective activation of the transfer material in a breadth corresponding only to the image areas of the original. Effective cementation or bonding takes place at that surface of the transfer material, contiguous to the master sheet. Mechanical separation thereafter of the master sheet and supply sheet causes ruptures in the layer of transfer material at the areas of cementation. Accordingly, plugs of transfer material, to the depth of the layer are pulled from the supply sheet thereby presenting on the master sheet a discrete and accurate master for use in the preparation of copies by the spirit type duplicator process.

*Example III, facsimile copy by shoot-through.*—In the preparation of a facsimile copy by shoot through, an assemblage is used such as shown in FIGURES 8A and 8B. As referred to previously, this is an assemblage for producing a second generation direct reading image by the shoot through technique. Therein the critical mechanisms are the original sheet 30, the copy sheet 40 and the composition of the transfer material layer carried on the supply sheet. The characteristics of the original sheet are:

| | |
|---|---|
| Caliper, mils | 1.4 |
| Densichron rating | 0.16 |
| Homogeneity | 0.02 |

The characteristics of the copy sheet are not of critical importance. The preferred composition of the tranfer material is as shown in FIGURE 21:

| | Percent |
|---|---|
| Major wax: | |
| Paraffin (Sunoco 5512) | 95 |
| Minor wax: | |
| Beeswax | 3 |
| Montan wax | 2 |
| | 5 | with Azo Oil Blue Black B dye being added to the wax mixture in an amount so as to constitute approximately 2% by weight of the total formulation. The thickness of the transfer composition layer is approximately 0.1 mil.

By exposing the non-integrated laminate at a traversal rate of 5.8 inches per second, there is provided a sharply delineated facsimile copy.

Specifically, exposure of the mechanism in accordance with the teachings of the invention results in selective activation of the transfer material to a discrete depth at the surface contiguous to the copy sheet and of a breadth corresponding only to the image areas of the original. The desired cementation or bonding takes place between the supply sheet and copy sheet so that thereafter mechanical separation of the sheets causes rupture in the layer of transfer material at the areas of cementation. In this manner plugs of transfer material, to the depth of its layer, are pulled from the supply sheet thereby presenting on the copy sheet a discrete and accurate copy of the original sheet.

*Example IV, facsimile copy by reflex.*—Facsimile copy by reflex employs the assemblage shown in FIGURES 11A and 11B and is referred to as the assemblage for producing second generation direct reading images by the reflex technique. Therein the important characteristics are those of the supply sheet 55 including the characteristics of its transfer layer 54 and its carrier sheet 56, and the characteristics of the copy sheet 40.

The characteristics of the transfer material are as described above in regard to Example III with the material being applied in a thickness of 0.1 mil on the carrier sheet. The carrier sheet has the preferred characteristics of:

| | |
|---|---|
| Caliper, mils | 1.2 |
| Densichron rating | 0.04 |
| Homogeneity | 0.04 |
| Smoothness, Sheffield | 90 |

The copy sheet has the preferred characteristics:

| | |
|---|---|
| Caliper, mils | 1.4 |
| Densichron rating | 0.16 |
| Homogeneity | 0.02 |
| Smoothness, Sheffield | 80 |

By operating the exposure device to traverse the infrared radiation source at the rate of 5 inches per minute, a sharply delineated facsimile copy is achieved.

Performance of the method of the invention in accordance with the novel reflex teachings causes selective activation of the transfer material substantially throughout the thickness of the layer and of a breadth corresponding only to the image areas of the original. Effective cementation or bonding takes place at the surface of the transfer material contiguous to the copy sheet. Mechanical separation thereafter of the copy sheet and supply sheet causes ruptures in the layer of transfer material at the areas of cementation. Accordingly, plugs of transfer material to the depths of the layer are pulled from the supply sheet thereby presenting on the copy sheet a discrete and accurate copy of the original sheet.

*Example V, offset lithographic master by shoot through.*—In preparing an offset lithographic master the assemblage shown in FIGURES 8A and 8B is employed. As pointed out previously, this is referred to as an assemblage for producing a second generation direct reading image by the shoot-through technique. The important characteristics therein are those of the original sheet 30, the master sheet 40, and the composition of the layer of transfer material 34.

The characteristics of the original sheet are:

| | |
|---|---|
| Caliper, mils | 1.4 |
| Densichron rating | 0.16 |
| Homogeneity | 0.02 |

The characteristics of the preferred lithographic master sheet are not of critical importance.

The composition of the transfer material is as illustrated in FIGURE 22:

| | Percent |
|---|---|
| Major wax: | |
| Paraffin wax (Sunoco 5512) | 50 |
| Montan wax | 50 | to which Oil Red O dye is added in an amount so as to constitute, by weight, approximately 2% of the total formulation. The layer of transfer material is of an approximate thickness of 0.1 mil.

By operating the exposure device to traverse the infrared radiation source at the rate of 5 inches per second, a sharply delineated and clean offset lithographic master sheet is achieved. Exposure of the mechanism in accordance with the teachings of the invention results in selective activation of the transfer material to a discrete depth at the surface contiguous to the master sheet and of a breadth corresponding only to the image areas of the original. The desired cementation or bonding takes place between the supply sheet and the master sheet so that thereafter mechanical separation of the sheets causes rupture in the layer of transfer material at the areas of cementation. In this manner plugs of transfer material, to the depth of its layer, are pulled from the supply sheet thereby presenting on the master sheet a discrete and accurate master copy of the original sheet for use in preparation of copies in a lithographic printing press.

*Example VI, offset lithographic master by reflex.*—Preparation of an offset lithographic master by the reflex technique requires an assemblage such as shown in FIGURES 11A and 11B and is referred to as an assemblage for producing second generation direct reading images by the reflex technique. Therein the important characteristics are those of the supply sheet 55 including the characteristics of its transfer layer 54 and its carrier sheet 56, and the characteristics of the copy or master sheet 40.

The characteristics of the original sheet are:

| | |
|---|---|
| Caliper, mils | 1.4 |
| Densichron rating | 0.16 |
| Homogeneity | 0.02 |

The characteristics of the preferred lithographic master sheet are:

| | |
|---|---|
| Caliper, mils | 1.6 |
| Densichron rating | 0.16 |
| Homogeneity | 0.01 |
| Smoothness, Sheffield | 21–250 |

The composition of the transfer material is as illustrated in FIGURE 22:

| | Percent |
|---|---|
| Major wax: | |
| Paraffin wax (Sunoco 5512) | 50 |
| Montan | 50 | with Oil Red O dye being added in an amount to constitute by weight 2% of the total formulation. The layer is applied in a thickness of 0.1 mil.

By operating the exposure device to traverse the infrared radiation source at a rate of 1.5 inches per second, a sharply delineated and clean offset lithographic master is achieved. Performance of the method of the invention in accordance with the novel reflex teachings causes selective activation of the transfer material in breadth corresponding only to the image areas of the original. Effective cementation or bonding takes place at the surface of the transfer material contiguous to the master sheet. Mechanical separation thereafter of the master sheet and supply sheet causes ruptures in the layer of transfer material at the areas of cementation. Accordingly, plugs of transfer material to the depth of the layer are pulled from this supply sheet thereby presenting on the master sheet a discrete and accurate master for use in preparation of copies by the lithographic printing process.

The foregoing examples are given only by the way of example and in the interest of making the complete teaching of the invention. The characteristics described therein are not considered to be limitations as to the only mechanisms that can be employed in the invention but are meant to define but one set of parameters within the range of parameters set forth herein. Similarly the selected examples are not to be taken to be the only arrangements that can be practiced in the invention, but are given specifically for the purposes of making an exemplary display of the facility and utility of the mechanisms and methods of the invention.

In view of the foregoing it is clear that there has been provided herewith a new and improved thermal transfer process and method for effecting contact copying of an original carrying thereon an image delineated by infrared radiation absorbing material and which concept has the advantage of being simple and compact so as to be easily adapted for office usage. Further, the new and improved thermo transfer process is adapted for producing a variety of kinds of copy including facsimile copy, solvent type duplicator master sheets and lithographic duplicator master sheets and of performing these copying functions at low temperatures only slightly above maximum temperatures normally experienced in our environment. Further, the arrangement is of a distinct advantage in that it can be utilized for producing quality copy simultaneously from a plurality of originals. Additionally, the arrangement provides means and methods for producing quality copy from originals for which the basis weight of the paper may vary over a wide range and for which the infrared opacity of the paper may vary between extremes.

The display in this specification has been exhaustive for purposes of achieving complete teaching of the invention. Necessarily some distinct and precise examples have been presented herein and it is not meant to limit the scope of the invention thereto but rather rely upon these as illustrations of the broad principles of the invention. Accordingly, it is meant to cover in the appended claims not only the specific structure described herein but also the alternatives, the variations and the modifications that fall within the true spirit and scope of the invention.

Application Serial No. 33,507 is a continuation-in-part of the applicant's co-pending application, Serial No. 7,482, now Patent No. 3,122,997, which last-named application is a continuation of the application, Serial No. 726,378, filed April 4, 1958, now abandoned, which last-named application is a continuation-in-part of the application, Serial No. 548,056, filed November 21, 1955, now abandoned.

What is claimed is:

1. A process of producing a copy for use as a spirit type duplicating sheet from an assemblage of sheets including an original sheet bearing thereon infrared absorbing, heat-generating image areas, a master sheet, one side of which constitutes the surface upon which the copy is to be made, and a material supply sheet carrying on one surface thereof a coating of spirit duplicating type transfer material which may be rendered plastic above a predetermined temperature by irradiating said assemblage with a source of infra-red radiation sufficient to raise the temperature of the coating in the areas corresponding to said image areas at least to said predetermined temperature, but below the melting point of said composition: the improvement comprising using as said transfer material a composition consisting essentially of a wax and oil mixture and a dye, wherein said wax and oil mixture is in the approximate proportion, by weight:

|  | Percent |
|---|---|
| Carnauba | 50±15 |
| Mineral oil | 30±15 |
| Castor oil and lanolin | 20±15 | and wherein said dye is essentially crystal violet included in an amount so as to constitute 50% ±10% by weight of the total composition, said composition being characterized as flowable at atmospheric pressure at a temperature in the range of from 140° F. to 145° F. and plastic to a state of adherence with said surface made contiguous therewith by pressures in excess of three pounds per square inch and at a temperature in the range from 120° F. to 140° F.

2. A process of producing a copy for use as a spirit type duplicating sheet from an assemblage of sheets including an original sheet bearing thereon infrared absorbing, heat-generating image areas and a master sheet, one side of which constitutes the surface upon which the copy is to be made and including a material supply sheet carrying on one surface thereof a coating of spirit duplicating type transfer material which may be rendered plastic above a predetermined temperature by irradiating said assemblage with a source of infrared radiation sufficient to raise the temperature of the coating in the areas corresponding to said image areas at least to said predetermined temperature, but below the melting point of said composition to plasticize the contiguous surface of said coating at the said areas and thereby attain a localized adherence between said copy surface and coating surface at said areas: the improvement comprising using as said transfer material a composition consisting essentially of a wax and oil mixture and a dye, wherein the wax and oil mixture is in the proportion, by weight:

|  | Percent |
|---|---|
| Carnauba wax | 44 |
| Mineral oil | 40 |
| Castor oil | 12 |
| Lanolin | 4 | and wherein said dye is essentially crystal violet included in an amount so as to constitute approximately 50% by weight of the total composition, said composition being characterized as flowable at atmospheric pressure at a temperature in the range from 140° F. to 145° F. and plastic to a state of adherence with said surface made contiguous therewith by pressure in excess of three pounds per square inch and at a temperature in the range from 125° F. to 140° F.

3. A process of producing a copy from an assemblage of sheets including an original sheet bearing thereon infrared absorbing heat generating image areas, a copy sheet, one side of which constitutes a surface upon which said copy is to be made and said material supply sheet carrying on said surface thereof a coating of transfer material which may be rendered plastic above a predetermined temperature by irradiating said assemblage with a source of infra-red radiation sufficient to raise the temperature of the coating at least to said predetermined temperature, but below the melting point of said composition: the improvement comprising using as said transfer material a composition consisting essentially of one or more waxes from the group consisting of paraffin wax and montan wax, synthetic waxes, fatty acids and insect waxes in an approximate proportion of 98% by weight, and an oil-soluble dye in an approximate proportion of 2% by weight, said composition being characterized as flowable at atmospheric pressure at a temperature of 135° F. to 145° F. and plastic to a state of adherence with said surface made contiguous therewith by pressures in excess of three pounds per square inch at a temperature in the range from 115° F. to 135° F.

4. The process claimed in claim 3 wherein said surface upon which said copy is made constitutes a lithographic surface and said waxes consist essentially of a mixture of paraffin wax in the approximate proportion of 49% by weight and montan wax in the approximate proportion of 49% by weight of the total weight of said composition.

5. A process of producing a copy from an assemblage of sheets including an original sheet bearing thereon infra-red absorbing heat generating image areas, a copy sheet, one side of which constitutes a surface upon which said copy is to be made and said material supply sheet carrying on said surface thereof a coating of transfer material which may be rendered plastic above a predetermined temperature by irradiating said assemblage with a source of infra-red radiation sufficient to raise the temperature of the coating at least to said predetermined temperature, but below the melting point of said composition: the improvement comprising using as said transfer material a composition consisting essentially of paraffin wax in the approximate proportion by weight of 94%, a mixture of beeswax and montan wax in the approximate proportion of 4% by weight and an oil-soluble dye in the approximate proportion of 2% by weight, said composition being characterized as flowable at atmospheric pressure at a temperature of 135° F. to 145° F. and plastic to a state of adherence with said surface made contiguous therewith by pressures in excess of three pounds per square inch at a temperature in the range from 115° F. to 135° F.

References Cited by the Examiner
UNITED STATES PATENTS

| | | | |
|---|---|---|---|
| 2,519,321 | 8/1950 | Newman | 117—36.1 |
| 2,740,896 | 4/1956 | Miller | 250—65.1 |
| 2,751,310 | 6/1956 | Kline | 117—36.1 |
| 2,824,812 | 2/1958 | Drautz | 106—271 |
| 2,927,210 | 3/1960 | O'Mara | 250—49.5 |

OTHER REFERENCES

Mosher, R. H., "Specialty Papers," Remsen Press Co., Brooklyn, New York, 1950, pp. 342–354.

ROBERT F. WHITE, *Primary Examiner.*

MORRIS LIEBMAN, ALEXANDER H. BRODMERKEL, *Examiners.*